United States Patent
Matsuo et al.

(10) Patent No.: US 11,118,531 B2
(45) Date of Patent: Sep. 14, 2021

(54) ENGINE CONTROL DEVICE AND METHOD OF CONTROLLING ENGINE

(71) Applicant: Mazda Motor Corporation, Hiroshima (JP)

(72) Inventors: Takeru Matsuo, Higashihiroshima (JP); Yoshie Kakuda, Hiroshima (JP); Sangkyu Kim, Higashihiroshima (JP); Daisuke Shimo, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 25 days.

(21) Appl. No.: 16/692,377

(22) Filed: Nov. 22, 2019

(65) Prior Publication Data
US 2020/0166000 A1    May 28, 2020

(30) Foreign Application Priority Data
Nov. 28, 2018    (JP) .............................. JP2018-222473

(51) Int. Cl.
F02D 41/00    (2006.01)
F02D 41/40    (2006.01)
F02D 41/30    (2006.01)
F02D 41/06    (2006.01)

(52) U.S. Cl.
CPC ......... *F02D 41/403* (2013.01); *F02D 41/061* (2013.01); *F02D 41/3035* (2013.01)

(58) Field of Classification Search
CPC .. F02D 41/403; F02D 41/3035; F02D 41/061; F02D 35/028; F02D 41/401; F02D 41/402; Y02T 10/40
See application file for complete search history.

(56) References Cited

U.S. PATENT DOCUMENTS

| | | | |
|---|---|---|---|
| 7,269,500 B2* | 9/2007 | Cochet | F02D 41/1497 701/114 |
| 8,543,313 B2* | 9/2013 | Borchsenius | F02D 41/3809 701/103 |
| 9,677,497 B2* | 6/2017 | Kuzuyama | F02D 41/402 |
| 10,012,174 B2* | 7/2018 | Shirahashi | F02D 41/402 |
| 10,087,877 B2* | 10/2018 | Shirahashi | F02D 41/403 |
| 10,197,005 B2* | 2/2019 | Shirahashi | F02D 41/402 |

(Continued)

FOREIGN PATENT DOCUMENTS

JP    2016166587 A    9/2016

*Primary Examiner* — David Hamaoui
(74) *Attorney, Agent, or Firm* — Alleman Hall Creasman & Tuttle LLP

(57) ABSTRACT

An engine control device is provided. A fuel injection valve performs a pre-injection and a main injection on a retarding side of the pre-injection so that pressure waves resulting from combustions caused by the injections cancel each other out. The control device secures a fuel injection amount to be supplied to a combustion chamber in one cycle by at least the pre-injection, the main injection, and a middle injection. The control device causes the fuel injection valve to perform the pre-injection at a timing when a piston is located at an advancing side of compression top dead center for premix combustion, to start the main injection during a combustion period of the fuel injected by the pre-injection for diffuse combustion, and to perform the middle injection at a timing between the other two injections with a fuel injection amount less than the other injections.

5 Claims, 16 Drawing Sheets

(56) References Cited

U.S. PATENT DOCUMENTS

| | | | |
|---|---|---|---|
| 10,907,568 B2* | 2/2021 | Matsuo | F02M 35/10373 |
| 10,989,135 B2* | 4/2021 | Matsuo | F02D 35/025 |
| 11,035,318 B2* | 6/2021 | Matsuo | F02D 41/365 |
| 2020/0011263 A1* | 1/2020 | Matsuo | F02D 41/405 |
| 2020/0011264 A1* | 1/2020 | Matsuo | F02D 41/3035 |

* cited by examiner

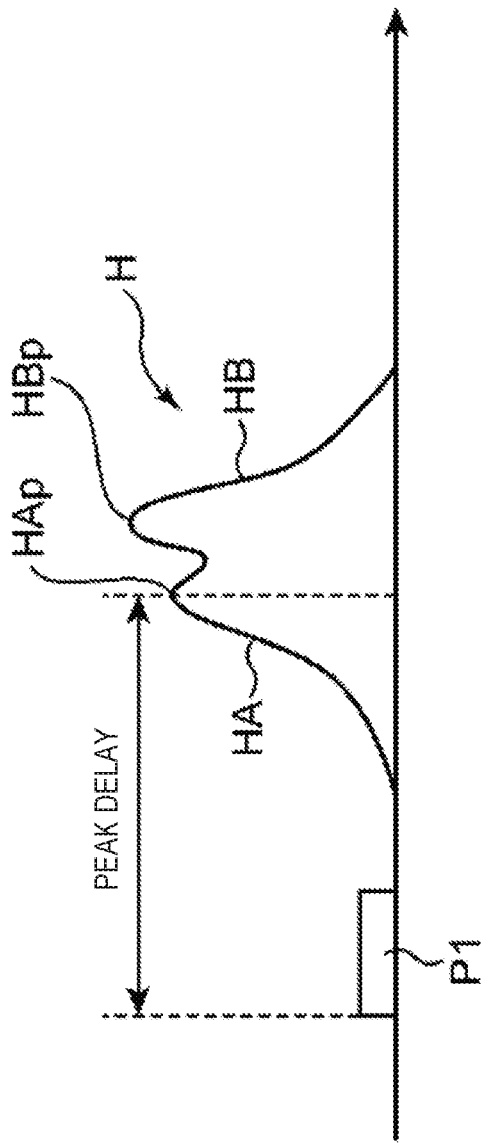

FIG. 15A

ESTIMATION MODEL EQUATION OF PEAK DELAY (ARRHENIUS TYPE ESTIMATION EQUATION)

PEAK DELAY = $A \times$ INJECTION AMOUNT$^B \times$ INJECTION TIMING$^C \times$ INJECTION PRESSURE$^D$
$\times$ IN-CYLINDER PRESSURE$^E \times \exp(F/$IN-CYLINDER TEMPERATURE$) \times$ WALL TEMPERATURE (WATER TEMPERATURE)$^G$
$\times$ IN-CYLINDER OXYGEN CONCENTRATION$^H \times$ ENGINE SPEED$^I$

FIG. 15B

CALIBRATION RESULT OF ESTIMATION MODEL EQUATION

| INDEX | A | B | C | D | E | F | G | H | I |
|---|---|---|---|---|---|---|---|---|---|
| ITEM | INTERCEPT | INJECTION AMOUNT | INJECTION TIMING | INJECTION PRESSURE | IN-CYLINDER PRESSURE | IN-CYLINDER TEMPERATURE | WALL SURFACE TEMPERATURE | IN-CYLINDER OXYGEN CONCENTRATION | ENGINE SPEED |
| MULTIPLE LINEAR REGRESSION | 246.9691168 | -0.36 | 0.55 | 0.28 | -0.79 | 3157.24 | -0.13 | -1.59 | 0.11 |

FIG. 15C

ENGINE CONTROL DEVICE AND METHOD OF CONTROLLING ENGINE

TECHNICAL FIELD

The present disclosure relates to a device and a method for controlling an engine, which perform a pre-injection for premix combustion and a main injection for diffuse combustion, as fuel injection into a combustion chamber.

BACKGROUND OF THE DISCLOSURE

In engines for vehicles, such as automobiles, a control for dividing fuel to be supplied during one cycle into a plurality of injections and injecting the fuel dividedly into a combustion chamber from an injector may be performed. JP2016-166587A discloses a control device which sets a peak interval of pressure rise rates resulting from a first fuel injection and a subsequent second fuel injection so that pressure waves caused by combustions by the injections are offset by a half cycle from each other. According to this control device, since the pressure wave of combustion by the first fuel injection and the pressure wave of combustion by the second fuel injection cancel each other out, combustion noise can be reduced.

As a mode in which fuel is dividedly injected into the combustion chamber, a pre-injection which aims at premix combustion, and a main injection at a retarding side of the pre-injection, which aims at diffuse combustion utilizing heat generated by the premix combustion, may be performed. Also in such a divided injection mode, it is considered in order to reduce combustion noise that fuel injection timings and fuel injection periods of both injections are set so that pressure waves resulting from combustions by both the injections are offset by the half cycle. However, since the combustion by the pre-injection (premix combustion) and the combustion by the main injection (diffuse combustion) are different in the combustion mode, frequency components of the generated pressure waves are naturally different as well. Therefore, there is a problem that combustion noise cannot fully be reduced even if the pre-injection and the main injection are performed aiming at the half-cycle offset of both the pressure waves.

SUMMARY OF THE DISCLOSURE

One purpose of the present disclosure is to provide a device and a method for controlling an engine, capable of reducing combustion noise as much as possible when performing a pre-injection for premix combustion and a main injection for diffuse combustion.

According to one aspect of the present disclosure, a control device for an engine is provided. The engine includes a combustion chamber and a fuel injection valve configured to directly inject fuel into the combustion chamber. The fuel injection valve performs a pre-injection and a main injection on a retarding side of the pre-injection so that pressure waves resulting from combustions caused by the injections cancel each other out. The control device includes a processor configured to execute a fuel injection controlling module to control operation of the fuel injection valve. The fuel injection controlling module secures a fuel injection amount to be supplied to the combustion chamber in one cycle by causing the fuel injection valve to perform at least three injections including the pre-injection, the main injection, and a middle injection. The fuel injection controlling module causes the fuel injection valve to perform the pre-injection at a timing when a piston is located at an advancing side of a compression top dead center for premix combustion. The fuel injection controlling module causes the fuel injection valve to start the main injection during a combustion period of the fuel injected by the pre-injection for diffuse combustion. The fuel injection controlling module causes the fuel injection valve to perform the middle injection at a timing between the pre-injection and the main injection with a fuel injection amount less than the main injection and the pre-injection.

According to this configuration, the fuel injection amount required for one cycle can be secured by performing the middle injection, in addition to the pre-injection and the main injection which are performed so that the pressure waves resulting from both the combustions cancel each other out. Therefore, the injection amounts of the pre-injection and the main injection can be reduced by the injection amount taken by the middle injection, and by the reduced amounts, peak values of the heat release rate caused by the combustions of the pre-injection and the main injection can be reduced. That is, the magnitudes of the pressure waves resulting from the combustions of the pre-injection and the main injection can be directly reduced. Therefore, combustion noise can be reduced effectively with the help of such injections that the pressure waves cancel each other out.

Moreover, the middle injection is performed at the timing between the pre-injection and the main injection. Therefore, since the combustion by the middle injection serves to fill the valley between the peaks of the heat release rates by the combustions of the pre-injection and the main injection and contributes to the engine torque, it does not reduce thermal efficiency. In addition, since the middle injection is performed with a small injection amount, it becomes possible to complete the combustion before the main injection, and it does not affect the combustion by the main injection. That is, since the combustion mode of the main injection which is set so that the pressure waves cancel each other out can be maintained, the cancelation effect of combustion noise will not be reduced.

When a compression stroke is equally divided into four quarter periods by a crank angle, the fuel injection controlling module may cause the fuel injection valve to perform the pre-injection in a final quarter period.

If the crank angle reaches the final quarter period of the compression stroke, although an in-cylinder temperature of the combustion chamber does not reach the ignition temperature, the in-cylinder temperature is raised to some extent, and therefore, a condition advantageous to the combustion of mixture gas is established. When a part or all of the pre-injection is performed at the first half of a compression stroke, or an intake stroke, there is concern that fuel spray may adhere to an inner wall surface of the cylinder to induce soot and deposit. According to the control device described above, such a problem can be avoided.

When performing the pre-injection and the main injection, the fuel injection controlling module may set each injection period of the fuel injection valve so that a fuel spray injected from the fuel injection valve has an injection distance that reaches a wall surface defining the combustion chamber. When performing the middle injection, the fuel injection controlling module may set an injection period of the fuel injection valve so that the fuel spray has an injection distance that does not reach the wall surface.

According to this configuration, the fuel injected by the pre-injection and the main injection are combusted by using a space (oxygen) in the area radially outward of the combustion chamber, and on the other hand, the fuel injected by the middle injection is combusted by using the space in the radially center area of the combustion chamber. Therefore, the fuel injected by the middle injection can certainly contribute to an engine torque while reducing combustion noise.

The fuel injection controlling module may set an injection period of the main injection so that a start timing of the main injection is closer to a compression top dead center compared to an end timing of the main injection.

According to this configuration, the start timing of the main injection can be prevented from being set wastefully earlier, and the combustion caused by the main injection can certainly be the diffuse combustion. Therefore, the explosive power by the diffuse combustion can more efficiently be converted to engine torque.

The fuel injection controlling module may set a start timing of the middle injection at a timing closer to a start timing of the main injection compared to an end timing of the pre-injection.

The fuel injected by the middle injection may be caught in the fuel injected by the main injection, if the combustion is not started by the start timing of the main injection. In this case, it is assumed that the fuel of the middle injection and the fuel of the main injection are combusted in the same area of the combustion chamber, and oxygen inside the combustion chamber is not effectively utilized. However, according to the control device described above, since the middle injection can be started at the timing close to the start timing of the main injection, the fuel of the middle injection is supplied to the environment inside the combustion chamber where the in-cylinder temperature is fully raised by the premix combustion by the pre-injection. Therefore, the fuel injected by the middle injection can be combusted immediately, and being caught in the injected fuel of the main injection can be prevented.

According to another aspect of the present disclosure, a method of controlling an engine including a combustion chamber and a fuel injection valve configured to directly inject fuel into the combustion chamber, is provided. The method includes the steps of setting a target torque of the engine according to an operating condition, determining a fuel injection amount to be supplied to the combustion chamber in one cycle based on the set target torque, and setting an injection pattern for causing the fuel injection valve to perform an injection operation with the determined fuel injection amount. Setting the injection pattern includes setting an injection pattern including a pre-injection performed at a timing when a piston is located at an advancing side of a compression top dead center for premix combustion, a main injection started at a retarding side of the pre-injection and during a combustion period of the pre-injection for diffuse combustion, and a middle injection performed at a timing between the pre-injection and the main injection, setting fuel injection timings and an injection amount ratio of the pre-injection and the main injection so that pressure waves resulting from combustions by the pre-injection and the main injection cancel each other out, and decreasing a part of the injection amounts assigned to the pre-injection and the main injection, while maintaining the injection amount ratio, and assigning the reduced injection amount to the middle injection.

According to this method, the pre-injection and the main injection are performed at the injection amount ratio set so that the pressure waves resulting from both the combustions cancel each other out. Moreover, the decreasing amounts from the part of the injection amounts assigned to each of these injections are assigned to the middle injection. Therefore, peak values of the heat release rate caused by the combustions of the pre-injection and the main injection can be reduced by the decreasing amounts. That is, the magnitudes of the pressure waves resulting from the combustions of the pre-injection and the main injection can be directly reduced. Further, since the decreasing is performed while maintaining the injection amount ratio, it does not reduce the cancelation effect of the pressure waves by each other, and combustion noise can be reduced effectively. Moreover, the middle injection is performed at the timing between the pre-injection and the main injection. Therefore, since the combustion by the middle injection serves as filling of the valley of the peaks of the heat release rates by the combustions of the pre-injection and the main injection and contributes to the engine torque, it does not reduce thermal efficiency.

Moreover, when a compression stroke is equally divided into four quarter periods by a crank angle, the injection pattern may be set so that the pre-injection is performed in a final quarter period.

Moreover, the injection pattern may be set so that, when performing each of the pre-injection and the main injection, a fuel spray injected from the fuel injection valve has an injection distance that reaches a wall surface defining the combustion chamber, and when performing the middle injection, the fuel spray has an injection distance that does not reach the wall surface.

Moreover, an injection period of the main injection may be set so that a start timing of the main injection is closer to a compression top dead center compared to an end timing of the main injection.

Moreover, a start timing of the middle injection may be set at a timing closer to a start timing of the main injection compared to an end timing of the pre-injection.

BRIEF DESCRIPTION OF DRAWINGS

FIG. 15A is a view illustrating a peak delay of combustion resulting from the pre-injection, FIG. 15B is an estimation model equation of the peak delay, and FIG. 15C is a view illustrating a calibration result of the estimation model equation, in a table form.

DETAILED DESCRIPTION OF THE DISCLOSURE

[Overall Configuration of Engine]

Figure 1:
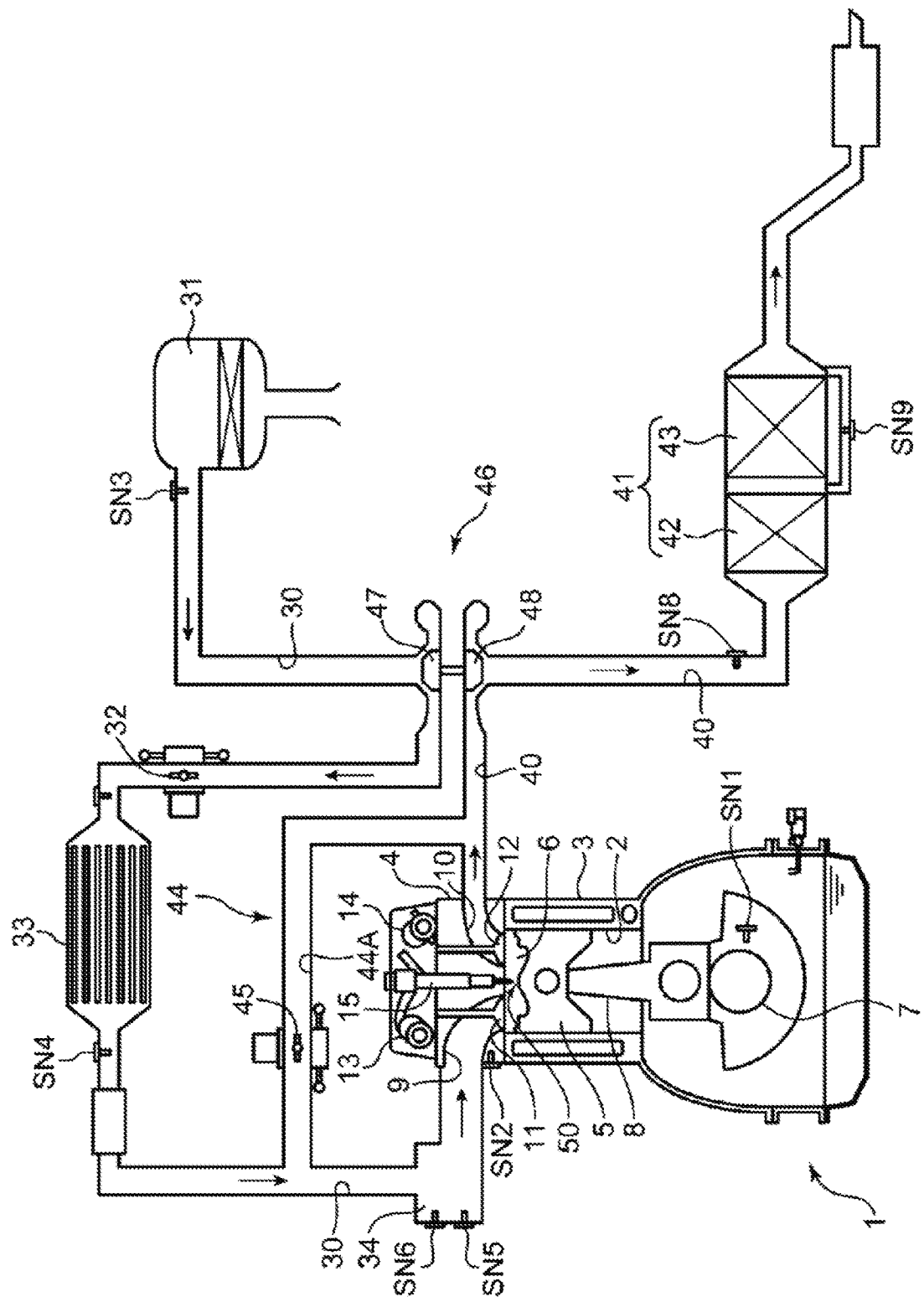
FIG. 1 is a system chart of a diesel engine to which a fuel injection control device according to the present disclosure is applied.

Hereinafter, one embodiment of a control device for an engine according to the present disclosure is described in detail, with reference to the accompanying drawings. This embodiment illustrates one example in which the present disclosure is applied to a control of a diesel engine system. First, the entire configuration of the diesel engine system is described with reference to FIG. 1. The diesel engine illustrated in FIG. 1 is a four-cycle diesel engine mounted to a vehicle, as a power source for propulsion. The diesel engine system includes an engine body 1 having a plurality of cylinders 2, which is driven by being supplied with fuel of which a main component is diesel fuel, an intake passage 30 through which intake air introduced into the engine body 1 circulates, an exhaust passage 40 through which exhaust gas discharged from the engine body 1 circulates, an exhaust gas recirculation (EGR) device 44 which recirculates a portion of the exhaust gas which circulates the exhaust passage 40 to the intake passage 30, and a turbocharger 46 which is driven by the exhaust gas which passes through the exhaust passage 40.

In the engine body 1, the plurality of cylinders 2 are lined up in a direction perpendicular to the drawing sheet of FIG. 1 (in FIG. 1, only one of them is illustrated). The engine body 1 includes a cylinder block 3, a cylinder head 4, and a piston 5. The cylinder block 3 has cylinder liners which form the cylinders 2. The cylinder head 4 is attached to an upper surface of the cylinder block 3, and covers openings formed at the top of the cylinders 2. Each piston 5 is reciprocatably accommodated inside the cylinder 2, and is connected with a crankshaft 7 through a connecting rod 8. According to the reciprocating motion of the pistons 5, the crankshaft 7 rotates on its center axis. The structure of the piston 5 will be described in full detail later.

Each combustion chamber 6 is formed above the piston 5. The combustion chamber 6 is formed by a lower surface of the cylinder head 4 (a ceiling surface 6U of the combustion chamber, refer to FIG. 3), the cylinder 2, and a crown surface 50 of the piston 5. The fuel is supplied to the combustion chamber 6 by an injection from an injector 15 described later. A mixture gas of the supplied fuel and air is combusted inside the combustion chamber 6, and the piston 5 depressed by an expansive force of the combustion reciprocates in the vertical direction.

A crank angle sensor SN1 and a water temperature sensor SN2 are attached to the cylinder block 3. The crank angle sensor SN1 detects a rotation angle of the crankshaft 7 (crank angle), and a rotating speed of the crankshaft 7 (engine speed). The water temperature sensor SN2 detects a temperature of cooling water or coolant (engine water temperature) which circulates inside the cylinder block 3 and the cylinder head 4.

An intake port 9 and an exhaust port 10 which communicate with each combustion chamber 6 are formed in the cylinder head 4. In the lower surface of the cylinder head 4, an intake-side opening which is a downstream end of each intake port 9, and an exhaust-side opening which is an upstream end of each exhaust port 10 are formed. An intake valve 11 which opens and closes each intake-side opening, and an exhaust valve 12 which opens and closes each exhaust-side opening are attached to the cylinder head 4. Note that although illustration is omitted, a valve type of the engine body 1 is the four-valve type comprised of two intake valves and two exhaust valves, where two intake ports 9 and two exhaust ports 10 are provided to each cylinder 2, and two intake valves 11 and two exhaust valves 12 are provided to each cylinder 2 as well.

An intake-side valve operating mechanism 13 and an exhaust-side valve operating mechanism 14 which include a cam shaft respectively, are disposed in the cylinder head 4. The intake valve 11 and the exhaust valve 12 are opened and closed by the valve operating mechanisms 13 and 14 in an interlocking manner with the rotation of the crankshaft 7. An intake VVT which can change at least an open timing of the intake valve 11 is built in the intake-side valve operating mechanism 13, and an exhaust VVT which can change at least a close timing of the exhaust valve 12 is built in the exhaust-side valve operating mechanism 14.

In the cylinder head 4, one injector 15 (fuel injection valve) which injects fuel into the combustion chamber 6 from a tip-end part thereof is attached to each cylinder 2. The injector 15 injects fuel supplied through a fuel feed pipe (not illustrated) to the combustion chamber 6. The injector 15 is attached to the cylinder head 4 so that the tip-end part from which the fuel is injected (a nozzle 151 in FIG. 10) is located at or near the center in the radial direction of the combustion chamber 6, and injects the fuel toward a cavity 5C (FIGS. 2A to 4), as will be described later, formed in the crown surface 50 of the piston 5. In this embodiment, in order to perform a middle injection within a narrow crank angle range between a pre-injection and a main injection which are described later, it is desirable to use the injector 15 of a high-speed response type of which a valve opening response speed (a time required for a completion of the valve opening from a start of supply of electrical current) is about 50 microseconds to about 200 microseconds.

The injector 15 is connected with a common rail for accumulating pressure (not illustrated) which is common to all the cylinders 2 through the fuel feed pipe. In the common rail, high-pressure fuel pressurized by a fuel feed pump (outside the drawing) is stored. By supplying the pressurized fuel inside the common rail to the injector 15 of each cylinder 2, the fuel is injected into the combustion chamber 6 at high pressure (about 50 MPa to about 250 MPa) from each injector 15. Between the fuel feed pump and the common rail, a fuel pressure regulator 16 (refer to FIG. 5, because not illustrated in FIG. 1) for changing a fuel injection pressure which is a pressure of the fuel injected from the injector 15 is provided.

The intake passage 30 is connected to one side surface of the cylinder head 4 so as to communicate with the intake port 9. Air (fresh air) taken in from an upstream end of the intake passage 30 is introduced into the combustion chamber 6 through the intake passage 30 and the intake port 9. An air cleaner 31, the turbocharger 46, a throttle valve 32, an intercooler 33, and a surge tank 34 are disposed in the intake passage 30 in this order from the upstream side.

The air cleaner 31 removes foreign substances in intake air to purify the intake air. The throttle valve 32 interlocks with a stepping-on operation of an accelerator pedal (not illustrated) to open and close the intake passage 30, thereby adjusting a flow rate of the intake air in the intake passage 30. The turbocharger 46 sends out the intake air to the downstream side of the intake passage 30, while compressing the intake air. The intercooler 33 cools the intake air compressed by the supercharger 46. The surge tank 34 is a tank which is disposed at an immediately upstream location of an intake manifold which continues to the intake port 9, and provides space for equally distributing the intake air to the plurality of cylinders 2.

An airflow sensor SN3, an intake air temperature sensor SN4, an intake pressure sensor SN5, and an intake $O_2$ sensor SN6 are disposed in the intake passage 30. The airflow sensor SN3 is disposed at the downstream side of the air cleaner 31, and detects a flow rate of the intake air which passes through this portion. The intake air temperature sensor SN4 is disposed at the downstream side of the intercooler 33, and detects a temperature of the intake air which passes through this portion. The intake pressure sensor SN5 and the intake $O_2$ sensor SN6 are disposed near the surge tank 34, and detect a pressure and an oxygen concentration of the intake air which passes through this portion, respectively. Note that although not illustrated in FIG. 1, an injection pressure sensor SN7 (FIG. 5) which detects an injection pressure of fuel from the injector 15 is provided.

The exhaust passage 40 is connected to the other side surface of the cylinder head 4 so as to communicate with the exhaust port 10. Burnt gas (exhaust gas) generated inside the combustion chamber 6 is discharged to the exterior of the vehicle through the exhaust port 10 and the exhaust passage 40. An exhaust emission control device 41 is provided in the exhaust passage 40. An oxidation catalyst 42 which oxidizes and detoxicates hazardous constituents (CO and HC) contained in exhaust gas, and a DPF (Diesel Particulate Filter) 43 for capturing particulate matters contained in the exhaust gas are built in the exhaust emission control device 41. Note that a $NO_x$ catalyst which reduces and detoxicates $NO_x$ may further be disposed at a position on the downstream side of the exhaust emission control device 41 in the exhaust passage 40.

An exhaust $O_2$ sensor SN8 and a pressure difference sensor SN9 are disposed in the exhaust passage 40. The exhaust $O_2$ sensor SN8 is disposed between the turbocharger 46 and the exhaust emission control device 41, and detects an oxygen concentration of exhaust gas which passes through this portion. The pressure difference sensor SN9 detects a pressure difference between an upstream end and a downstream end of the DPF 43.

The EGR device 44 includes an EGR passage 44A which connects the exhaust passage 40 with the intake passage 30, and an EGR valve 45 provided to the EGR passage 44A. The EGR passage 44A connects a portion of the exhaust passage 40 at the upstream side of the turbocharger 46 with a portion of the intake passage 30 between the intercooler 33 and the surge tank 34. Note that an EGR cooler (not illustrated) which cools exhaust gas (EGR gas) recirculating from the exhaust passage 40 to the intake passage 30 by a heat exchange is disposed in the EGR passage 44A. The EGR valve 45 adjusts a flow rate of exhaust gas which circulates the EGR passage 44A.

The turbocharger 46 includes a compressor 47 disposed at the intake passage 30 side, and a turbine 48 disposed at the exhaust passage 40 side. The compressor 47 and the turbine 48 are coupled to each other through a turbine shaft so that they are integrally rotatable. The turbine 48 is rotated by receiving energy of the exhaust gas that flows through the exhaust passage 40. By the compressor 47 being rotated in the interlocked manner, air which circulates the intake passage 30 is compressed (supercharged or boosted).

[Detailed Structure of Piston]

Figure 2A:
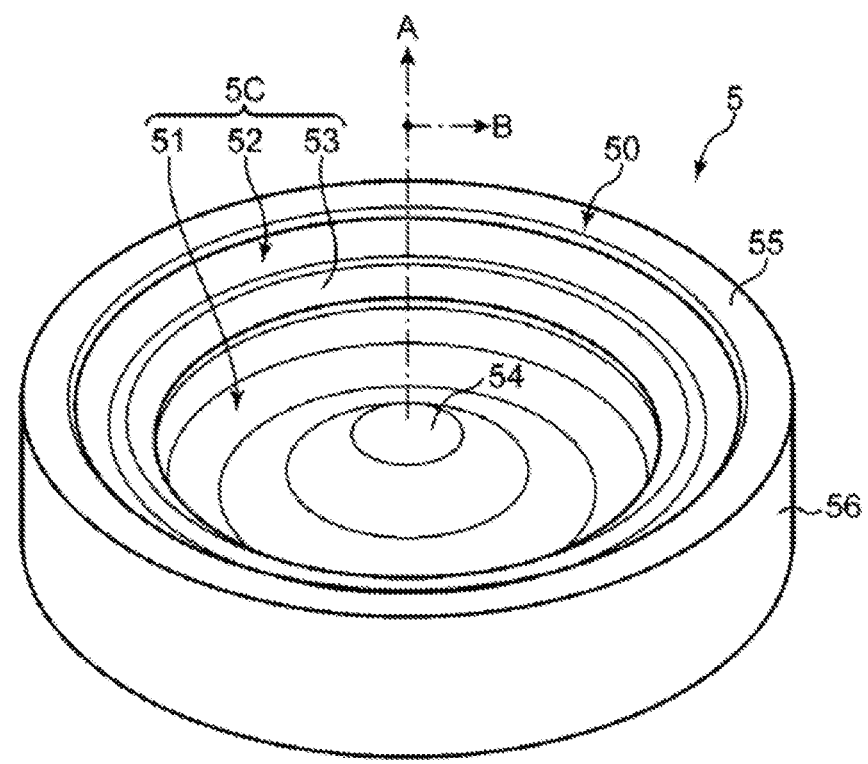
FIG. 2A is a perspective view of a crown surface portion of a piston of the diesel engine illustrated in FIG. 1.
Figure 2B:
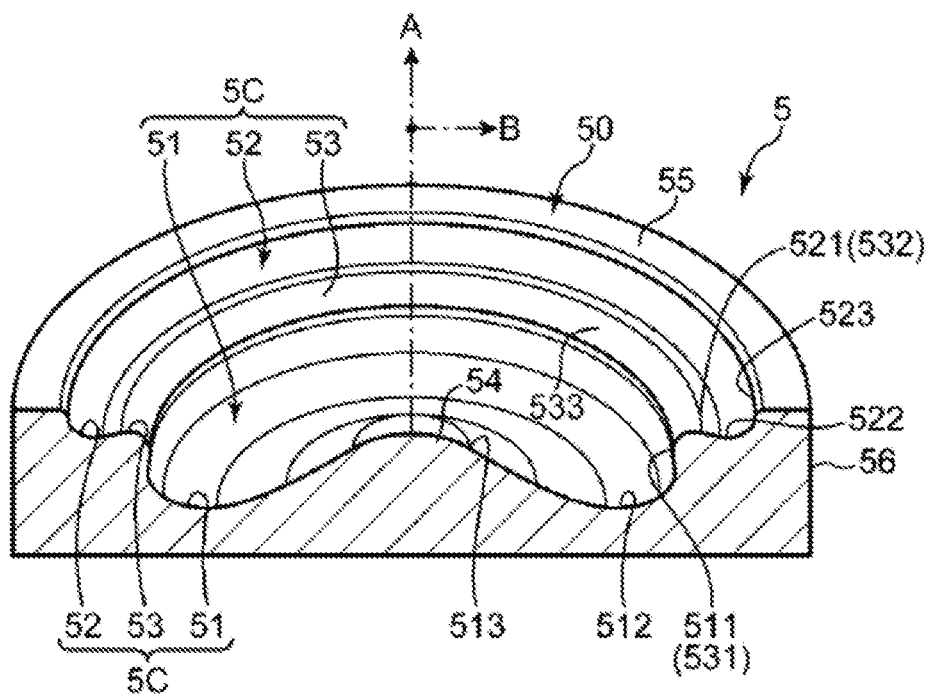
FIG. 2B is a perspective view illustrating a cross-section of the piston.
Figure 3:
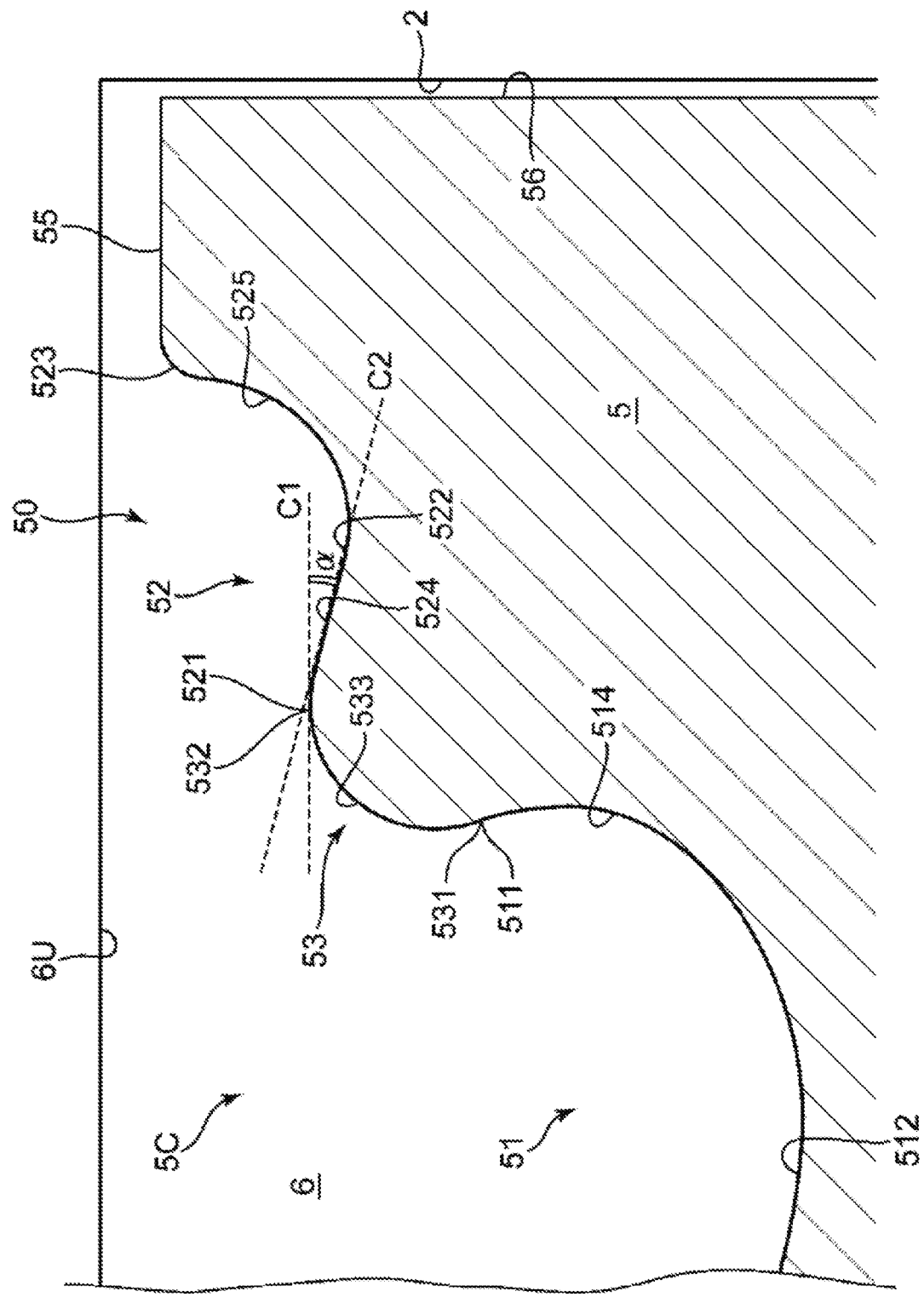
FIG. 3 is an enlarged view of the piston cross-section illustrated in FIG. 2B.

Next, the structure of the piston 5, particularly, the structure of the crown surface 50 is described in detail. FIG. 2A is a perspective view mainly illustrating an upper part of the piston 5. Although the piston 5 includes a piston head located on the upper side and a skirt part located on the lower side, FIG. 2A illustrates the piston head part having the crown surface 50 in a top surface thereof. FIG. 2B is a perspective view illustrating a radial cross-section of the piston 5. FIG. 3 is an enlarged view of the radial cross-section illustrated in FIG. 2B. Note that in FIGS. 2A and 2B, a cylinder axis direction A and a radial direction B of the combustion chamber are illustrated by arrows.

The piston 5 includes the cavity 5C, a peripheral flat surface part 55, and a side circumferential surface 56. A part of a wall surface of the combustion chamber surface (the bottom surface) which defines the combustion chamber 6 is formed by the crown surface 50 of the piston 5, and the cavity 5C is provided to the crown surface 50. The cavity 5C is a portion of the crown surface 50 which is recessed downwardly in the cylinder axis direction A, and is a portion which receives the injection of fuel from the injector 15. The peripheral flat surface part 55 is an annular flat surface part disposed in an area of the crown surface 50 near a perimeter edge in the radial direction B. The cavity 5C is disposed in a center area of the crown surface 50 in the radial direction B, excluding the peripheral flat surface part 55. The side circumferential surface 56 is a surface which slidably contacts an inner wall surface of the cylinder 2, and is provided with a plurality of ring grooves into which piston rings (not illustrated) are fitted.

Figure 10:
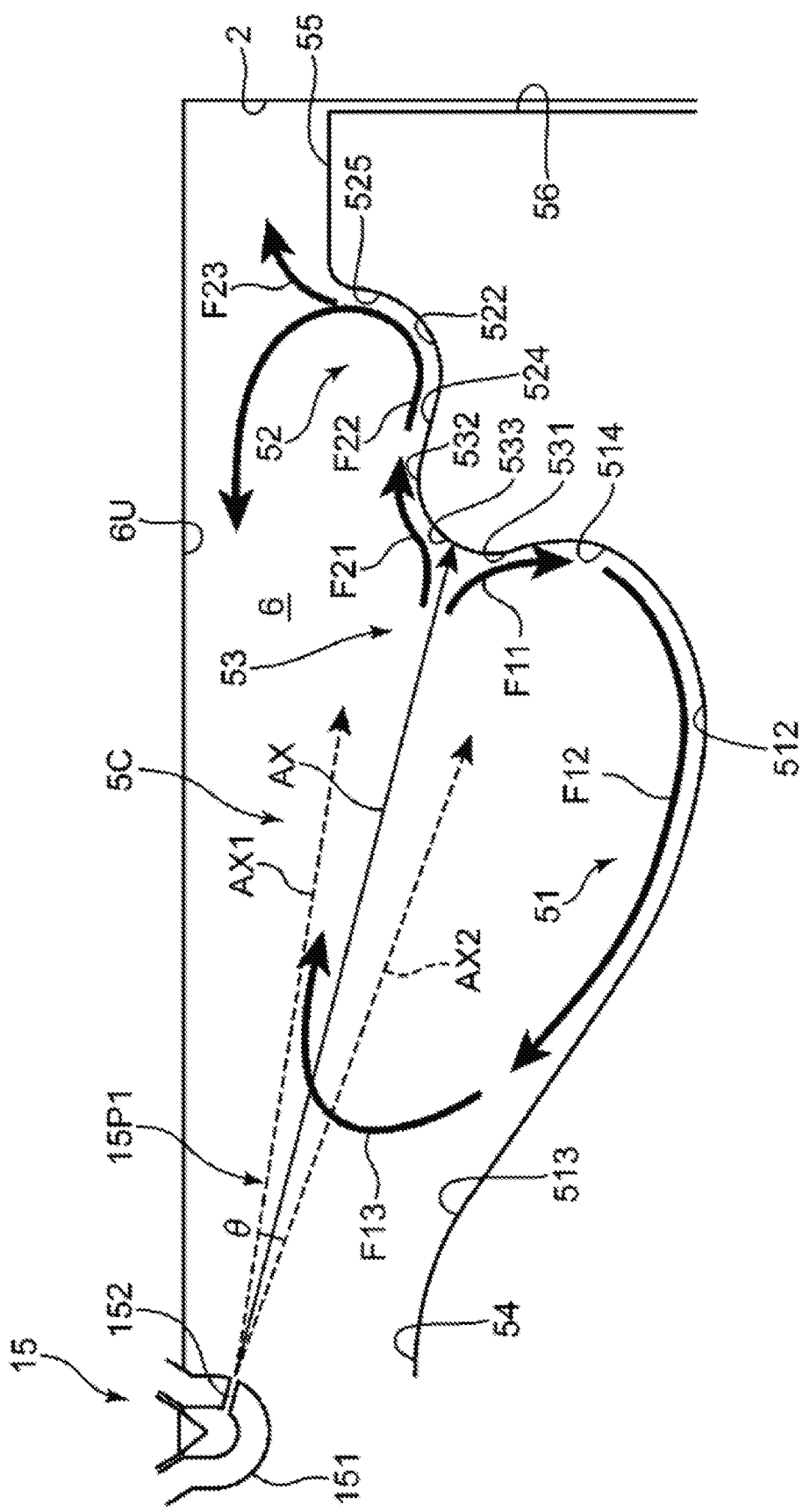
FIG. 10 is a cross-sectional view of the combustion chamber, illustrating a flow state of a mixture gas in the pre-injection.

The cavity 5C includes a first cavity part 51, a second cavity part 52, a connecting part 53, and a mountain part 54. The first cavity part 51 is a recessed part disposed in the center area of the crown surface 50 in the radial direction B. The second cavity part 52 is an annular recessed part disposed at the perimeter side of the first cavity part 51 in the crown surface 50. The connecting part 53 is a part which connects the first cavity part 51 with the second cavity part 52 in the radial direction B. The mountain part 54 is a mountain-shaped convex part disposed in the center position of the crown surface 50 (the first cavity part 51) in the radial direction B. The mountain part 54 is bulged at a position directly under the nozzle 151 of the injector 15 (FIG. 10).

The first cavity part 51 includes a first upper end part 511, a first bottom part 512, and a first inner end part 513. The first upper end part 511 is located at the highest position of the first cavity part 51, and continues to the connecting part 53. The first bottom part 512 is an annular area in a plan view which is recessed most in the first cavity part 51. As for the entire cavity 5C, this first bottom part 512 is the deepest part, and the first cavity part 51 has a given depth in the cylinder axis direction A in the first bottom part 512. In the plan view, the first bottom part 512 is located at a position close to and inward of the connecting part 53 in the radial direction B.

Between the first upper end part 511 and the first bottom part 512, they are connected by a radially dented part 514 which curves outwardly in the radial direction B. The radially dented part 514 has a portion which is dented outwardly in the radial direction B from the connecting part 53. The first inner end part 513 is located at the most radially inward position in the first cavity part 51, and continues to a lower end of the mountain part 54. Between the first inner end part 513 and the first bottom part 512, they are connected by a curved surface which curves gently in the shape of foot of a mountain.

The second cavity part 52 includes a second inner end part 521, a second bottom part 522, a second upper end part 523, a taper area 524, and a standing wall area 525. The second inner end part 521 is located at the most radially inward position of the second cavity part 52, and continues to the connecting part 53. The second bottom part 522 is a most dented area in the second cavity part 52. The second cavity part 52 has a depth in the cylinder axis direction A, shallower than the first bottom part 512 in the second bottom part 522. That is, the second cavity part 52 is a recessed part located above in the cylinder axis direction A from the first cavity part 51. The second upper end part 523 is the highest position in the second cavity part 52, is located at the most radially outside, and continues to the peripheral flat surface part 55.

The taper area 524 extends toward the second bottom part 522 from the second inner end part 521, and is a portion having such a surface shape that it inclines downwardly in the radially outward direction. As illustrated in FIG. 3, the taper area 524 has an inclination along an inclination line C2 which intersects with a horizontal line C1 extending in the radial direction B, by an inclination angle α.

The standing wall area 525 is a wall surface formed so as to rise comparatively steeply from a location radially outward of the second bottom part 522. In the cross-sectional shape in the radial direction B, the portion from the second bottom part 522 to the second upper end part 523, which is a curved surface which curves so that the wall surface of the second cavity part 52 goes up from the horizontal direction, and is a wall surface which is almost a vertical wall near the second upper end part 523, is the standing wall area 525. A lower part of the standing wall area 525 is located inwardly in the radial direction B from an upper end position of the standing wall area 525. Thus, combustion in which the mixture gas is prevented from excessively returning inwardly in the radial direction B of the combustion chamber 6, and a space (a squish space) radially outward of the standing wall area 525 is effectively utilized can be performed.

The connecting part 53 has a shape in the cross-sectional shape in the radial direction B, between the first cavity part 51 located at the lower side and the second cavity part 52 located at the upper side, which projects in a bump shape radially inwardly. The connecting part 53 has a lower end part 531, a third upper end part 532 (an upper end part in the cylinder axis direction), and a center part 533 located at the center therebetween. The lower end part 531 is a connecting part to the first upper end part 511 of the first cavity part 51. The third upper end part 532 is a connecting part to the second inner end part 521 of the second cavity part 52.

In the cylinder axis direction A, the lower end part 531 is a portion located at the lowest position of the connecting part 53, and the third upper end part 532 is a portion located at the highest position. The taper area 524 described above is also an area which extends toward the second bottom part 522 from the third upper end part 532. The second bottom part 522 is located below the third upper end part 532. That is, the second cavity part 52 of this embodiment does not have a bottom surface which extends horizontally and outwardly in the radial direction B from the third upper end part 532, and, in other words, the portions from the third upper end part 532 to the peripheral flat surface part 55 are not connected through a horizontal surface, but have the second bottom part 522 depressed downwardly from the third upper end part 532.

Although the mountain part 54 projects upwardly, the projection height is the same as the height of the third upper end part 532 of the connecting part 53, and the top of the projection is located at a more dented location from the peripheral flat surface part 55. The mountain part 54 is located at the center of the first cavity part 51 which is circular in the plan view, and, thereby, the first cavity part 51 is an annular groove formed around the mountain part 54.

[Curved Surface Shape of Cavity Part]

Figure 4:
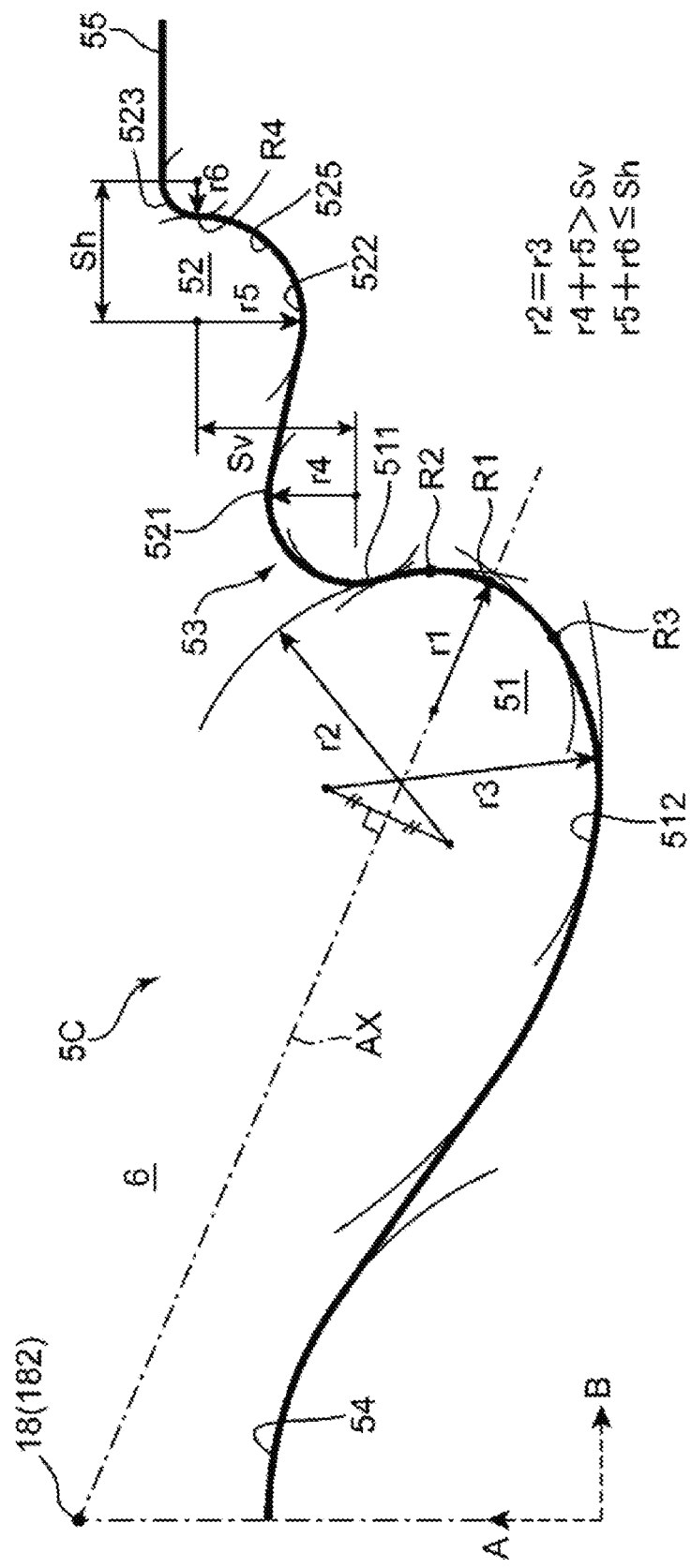
FIG. 4 is a view illustrating a curved surface shape of a first cavity part, a second cavity part, and a connecting part.

FIG. 4 is a cross-sectional view in the cylinder axis direction A, illustrating the curved surface shape of the first and second cavity parts 51 and 52 and the connecting part 53. The first cavity part 51 is provided, in the cross-section including the cylinder axis, with a surface shape which follows a Descartes' egg-shaped oval curve (hereinafter, referred to as the "Egg Shape"). In detail, the first cavity part 51 includes a first portion R1 of an arc shape located furthest from the injector 15 (an injection hole 152), a second portion R2 located between the first portion R1 and the connecting part 53, and a third portion R3 extending inwardly in the radial direction B from the first portion R1. If the shape is applied to the shape in FIG. 3, the first portion R1 corresponds to a center area of the radially dented part 514, the second portion R2 corresponds to an area extending from the radially dented part 514 to the first upper end part 511, and the third portion R3 corresponds to an area extending from the radially dented part 514 to the first bottom part 512.

FIG. 4 illustrates a state where an injection axis AX of fuel injected from the injector 15 intersects with the first portion R1 furthest from the injector 15. The Egg Shape of the first cavity part 51 is an arc shape in which a radius r1 of such a first portion R1 is the smallest, and the radius increases continuously as it goes toward the second portion R2 from the first portion R1, and as it goes toward the third portion R3 from the first portion R1. That is, a radius r2 of the second portion R2 increases as it separates from the first portion R1 in the counterclockwise direction in the cross-section of FIG. 4. Moreover, the radius r3 of the third portion R3 increases at the same rate as the radius r2 of the second portion R2 (r2=r3) as it separates from the first portion R1 in the clockwise direction. If the Egg Shape is expressed by using the connecting part 53 as a starting point, it has an arc shape in which the radius of the arc decreases from the second portion R2 to the first portion R1, and the radius of the arc increases from the first portion R1 to the third portion R3.

The connecting part 53 has a convex surface shape comprised of a curved surface having a given radius r4 from the lower end part 531 (the first upper end part 511) to the third upper end part 532 (the second inner end part 521). The second cavity part 52 has a concave surface shape comprised of a curved surface having a given radius r5, from the second bottom part 522 to the standing wall area 525. The second upper end part 523 has a convex surface shape comprised of a curved surface having a given radius r6. Suppose that a distance in the cylinder axis direction A between the center point of the radius r4 and the center point of the radius r5 is a second distance Sv, and a distance in the radial direction B between the center point of the radius r5 and the center point of the radius r6 is a first distance Sh, numerical values of the radii r4, r5, and r6 are selected so that the following relationships are satisfied.

$$r4+r5>Sv$$

$$r5+r6 \leq Sh$$

In the second cavity part 52, a portion extending from the second bottom part 522 to an upper end position R4 of the standing wall area 525 is formed by an approximately quarter circular shape (¼ circle) of the radius r5. The upper end position R4 of the standing wall area 525 continues to a lower end position of the second upper end 523 comprised of an approximately quarter circular shape of the radius r6. Note that an upper end of the second upper end part 523 continues to the peripheral flat surface part 55. As a result of being formed in such a curved surface shape, the lower part of the standing wall area 525 is located inward in the radial direction B of the upper end position R4 of the standing wall area 525. That is, the standing wall area 525 does not have a portion scooped out outwardly in the radial direction B, unlike the radially dented part 514 of the first cavity part 51. Although described in full detail later, the reason why the standing wall area 525 is formed in such an arc shape is that the mixture gas is prevented from excessively returning inwardly in the radial direction B of the combustion chamber 6, by collaborating with the Egg Shape of the first cavity part 51, and the combustion in which the space (squish space) outward in the radial direction B of the standing wall area 525 is effectively utilized is performed.

[Control Configuration]

Figure 5:
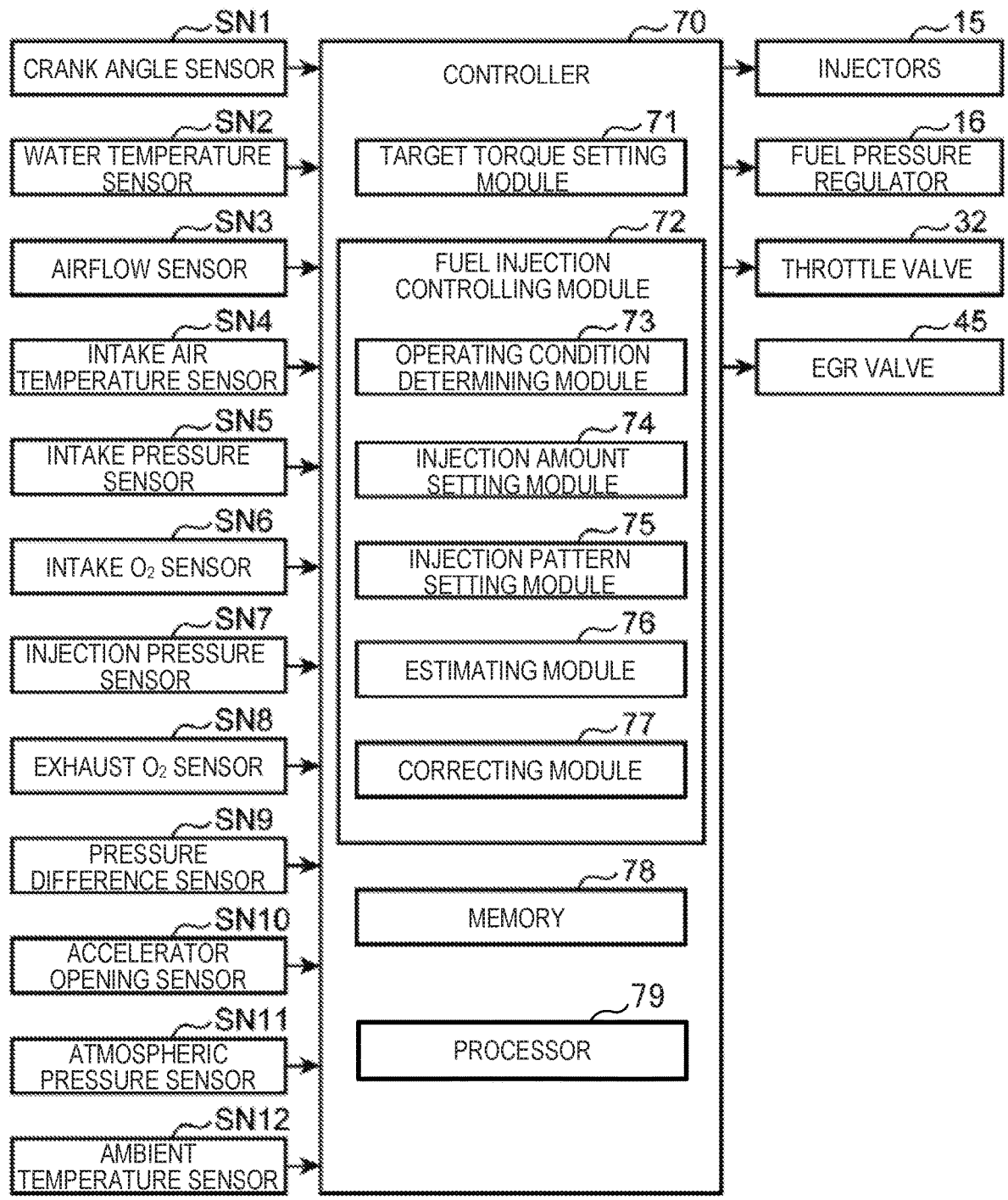
FIG. 5 is a block diagram illustrating a control system for an engine.

Next, a control configuration of the diesel engine system is described based on a block diagram of FIG. 5. The diesel engine system of this embodiment is integrally controlled by a controller 70 (engine control device). The controller 70 is comprised of a processor 79 (e.g., a central processing unit (CPU)) having associated ROM, RAM, etc. Detection signals from various sensors mounted to the vehicle are inputted into the controller 70. In addition to the sensors SN1-SN9 described above, the vehicle is provided with an accelerator opening sensor SN10 which detects an accelerator opening, an atmospheric pressure sensor SN11 which measures the atmospheric pressure of the operating environment around the vehicle, and an ambient temperature sensor SN12 which measures a temperature of the operating environment around the vehicle.

The controller 70 is electrically connected to the crank angle sensor SN1, the water temperature sensor SN2, the airflow sensor SN3, the intake air temperature sensor SN4, the intake pressure sensor SN5, the intake $O_2$ sensor SN6, the injection pressure sensor SN7, the exhaust $O_2$ sensor SN8, the pressure difference sensor SN9, the accelerator opening sensor SN10, the atmospheric pressure sensor SN11, and the ambient temperature sensor SN12, which are described above. Information detected by these sensors SN1-SN12, that is, information including the crank angle, the engine speed, the engine water temperature, the intake air flow rate, the intake air temperature, the intake pressure, the intake oxygen concentration, the fuel injection pressure of the injector 15, the exhaust oxygen concentration, the accelerator opening, the ambient temperature, and the atmospheric pressure are sequentially inputted into the controller 70.

The controller 70 controls each part of the engine, while performing various determinations, calculations, etc. based on the input signals from the sensors SN1-SN12, etc. That is, the controller 70 is electrically connected with the injectors 15 (fuel pressure regulator 16), the throttle valve 32, and the EGR valve 45, and outputs control signals to these apparatuses based on results of the calculations, respectively.

The controller 70 executes software modules to achieve their respective functions, including a target torque setting module 71 and a fuel injection controlling module 72 which controls operation of the injector 15. These modules are stored in memory 78 as software.

The target torque setting module 71 sets a target torque of the engine according to an operating condition. In detail, the target torque setting module 71 sets the target torque of the engine based on the accelerator opening detected by the accelerator opening sensor SN10.

The fuel injection controlling module 72 controls a fuel injection operation by the injector 15. In each cycle of an operating range where premixed compression ignition combustion is applied (PCI range), the fuel injection controlling module 72 causes the injector 15 to perform at least three injections including the pre-injection, the main injection performed at the retarding side of the pre-injection, and the middle injection performed at a timing between the pre-injection and the main injection. That is, a fuel injection amount to be supplied to the combustion chamber 6 during one cycle is secured by the pre-injection, the main injection, and the middle injection.

The fuel injection controlling module 72 operates so as to functionally be provided with an operating condition determining module 73, an injection amount setting module 74, an injection pattern setting module 75, an estimating module 76, and a correcting module 77.

The operating condition determining module 73 acquires operating condition information, such as an engine speed, an engine load, an engine water temperature, an engine oil temperature, an ambient temperature, an intake air temperature, an intake pressure, an oxygen concentration, and a valve opening of the EGR valve 45 based on detection values of the sensors SN1-SN12, and determines the operating condition, etc. of the engine body 1.

The injection amount setting module 74 sets an injection amount of fuel to be injected from the injector 15 per one cycle. The injection amount to be set is a target injection amount which achieves the target torque which is set by the target torque setting module 71.

The injection pattern setting module 75 reads a setting map of the injection pattern which is preset for every target injection amount (a combination of the engine speed and the engine load), and sets the injection pattern according to the target injection amount. The injection pattern setting becomes a pattern including the pre-injection, the main injection, and the middle injection, when the operating condition determining module 73 determines the operating condition is at least the PCI range. Moreover, as for the pre-injection and the main injection, injection timings and an injection amount ratio of both the injections are set so that pressure waves respectively resulting from the combustions caused by these injections cancel each other out. Further, a fuel injection amount of the middle injection is less than the fuel injection amounts of the pre-injection and the main injection, and is set so that a part of the injection amount respectively assigned to the pre-injection and the main injection is decreased while maintaining the injection amount ratio, and the decreased amount is assigned the middle injection. Note that the injection pattern setting module 75 may sequentially set the injection pattern based on the operating condition information acquired by the operating condition determining module 73 and the target injection amount, without depending on the setting map.

The estimating module 76 estimates an occurring timing of a peak of the heat release rate of the premix combustion by the pre-injection, with reference to a fuel injection timing of the pre-injection set by the injection pattern setting module 75, and a given combustion environmental factor which affects the combustion inside the combustion chamber 6. The estimating module 76 uses a given estimation model equation for this estimation (this will be described later with reference to FIG. 15). When the peak of the heat release rate of the premix combustion is offset due to the combustion environmental factor, since it becomes impossible to achieve a target heat release rate characteristic (achieved by the injection pattern as scheduled by the setting map) set so that the pressure waves could cancel each other out, the estimating module 76 performs a calculation to obtain the offset. The peak of the heat release rate of the premix combustion can be adjusted by a feedback control based on the detection results of the various sensors SN1-SN12. However, in the feedback control, a diesel knocking noise may occur in actual case, which may make a driver uncomfortable. Therefore, the estimating module 76 estimates the offset by a feed-forward approach which uses the estimation model equation.

The correcting module 77 corrects the fuel injection timing of the pre-injection set by the injection pattern setting module 75, based on the occurring timing of the peak of the heat release rate of the premix combustion estimated by the estimating module 76. That is, the correcting module 77 corrects the fuel injection timing so that the offset between the occurring timing of the peak of the heat release rate when performing the pre-injection at the fuel injection timing according to the setting map and the occurring timing of the peak of the heat release rate estimated by the estimating module 76 with reference to the combustion environmental factor is canceled out. That is, the correction to cancel the offset is performed before the diesel knocking noise occurs.

The memory 78 stores the setting map which is referred when the injection pattern setting module 75 sets the injection pattern. Moreover, the memory 78 stores the estimation model equation used when the estimating module 76 performs the given calculation. In addition, the memory 78 stores various kinds of programs and various kinds of settings.

[Example of Injection Pattern]

Figure 6:
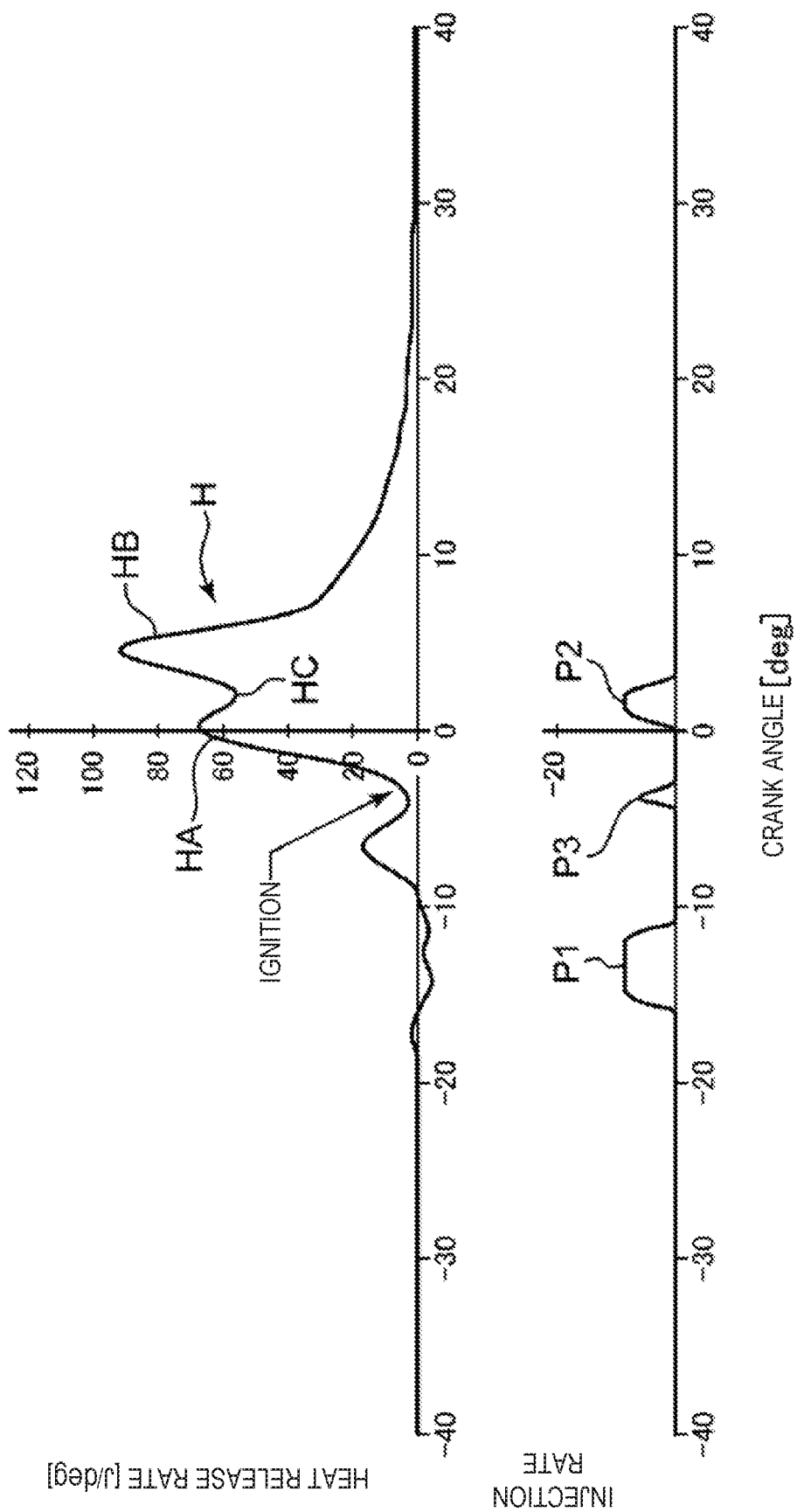
FIG. 6 is a time chart illustrating timing of a fuel injection and a rate of heat release.

Next, one example of the injection pattern of fuel set by the injection pattern setting module 75, and the heat release rate characteristic resulting from the combustion caused by the injection are described. FIG. 6 is a time chart illustrating a timing of the fuel injection, and a heat release rate characteristic H. As described above, the fuel injection controlling module 72 causes the injector 15 to perform a pre-injection P1, a main injection P2, and a middle injection P3.

The pre-injection P1 is performed at a timing when the piston 5 is located at the advancing side of a compression top dead center (TDC). The pre-injection P1 aims at that the premix combustion of the injected fuel is carried out, and is performed in a later stage of the compression stroke where an in-cylinder pressure and an in-cylinder temperature become high to some extent. In FIG. 6, the example where the pre-injection P1 is performed during a period of one crank angle (−CA16deg) to another crank angle (−CA12deg) is illustrated. As for a spatial relationship with the cavity 5C, the pre-injection P1 is set at a timing (crank angle) where the injector 15 can inject fuel toward the connecting part 53. That is, the pre-injection P1 is performed at a timing where the injection axis AX of the injector 15 intersects with the connecting part 53.

The main injection P2 is located at the retarding side of the pre-injection P1, and is started during a period of the fuel injected by the pre-injection P1 being carrying out the premix combustion. That is, the main injection P2 aims at that diffuse combustion of the fuel injected using the heat of the premix combustion is carried out, and is a fuel injection which is started at a timing where the piston 5 is located substantially near a TDC. In FIG. 6, the example where the main injection P2 is performed at a timing where the piston 5 is located at a slightly retarding side of the TDC is illustrated. As for the spatial relationship with the cavity 5C, the main injection P2 is set as the timing where the injector 15 can inject fuel toward the first cavity part 51. Although the peak value of the fuel injection rate is the same for the pre-injection P1 and the main injection P2, a fuel injection period (that is, the fuel injection amount) of the pre-injection P1 is set longer (more).

The middle injection P3 is an injection performed at the timing between the pre-injection P1 and the main injection P2. The fuel injected by the middle injection P3 is to combust between the combustion of the pre-injection P1 and the combustion of the main injection P2. The middle injection P3 is also diffuse combustion in general. FIG. 6 illustrates the example where the middle injection P3 is started from a crank angle of −CA6deg. The fuel injection period (fuel injection amount) of the middle injection P3 is set shorter (less) than both of the pre-injection P1 and the main injection P2.

The heat release rate characteristic H by the respective combustion of the pre-injection P1, the main injection P2, and the middle injection P3 is illustrated in FIG. 6. The heat release rate characteristic H is a characteristic deeply related with an increasing rate of the combustion pressure inside the combustion chamber 6, and has an earlier-stage combustion portion HA which is a mountain part caused by the premix combustion accompanying the pre-injection P1, a later-stage combustion portion HB which is caused by the diffuse combustion accompanying the main injection P2, and a middle combustion portion HC which is in the middle of both the combustion portions HA and HB. That is, in the heat release rate characteristic H, the peak of the heat release rate appears in two steps, resulting from the respective combustions of the pre-injection P1 and the main injection P2 with comparatively larger injection amounts which are performed at separated timings. Although described in full detail later, the middle injection P3 is an injection for lowering the peaks of the heat release rate resulting from the respective combustions of the pre-injection P1 and the main injection P2.

[Two-Step Peak of Heat Release Rate and Cancelation of Combustion Noise]

The pre-injection P1 and the main injection P2 are performed so that the pressure waves resulting from the respective combustions caused by these injections cancel each other out. That is, the fuel injection controlling module 72 causes the injector 15 to perform the pre-injection P1 and the main injection P2 so that the respective combustions occur at the timings where combustion noises resulting from the respective injections can cancel each other out. This is described with reference to FIG. 7.

Figure 7A:
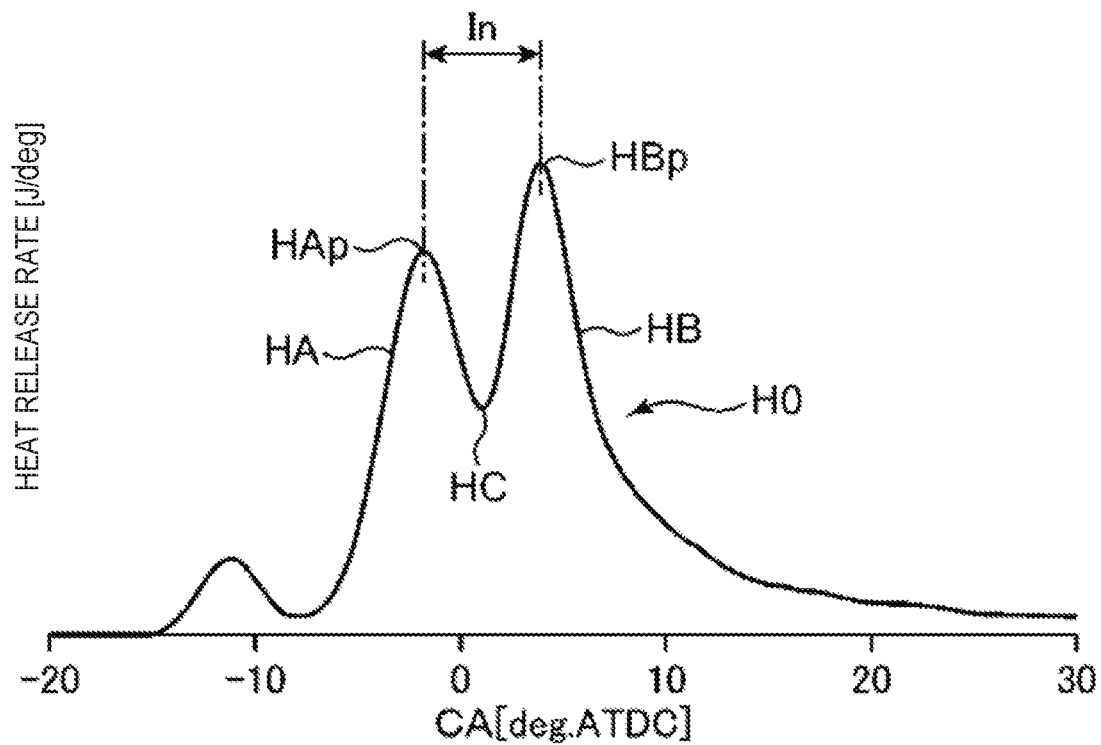
FIG. 7A is a graph illustrating an interval of a peak of the rate of heat release of combustion by a pre-injection and a main injection.

FIG. 7A illustrates a heat release rate characteristic H0 having the two-step peak of the heat release rate, similar to the heat release rate characteristic H illustrated in FIG. 6. The heat release rate characteristic H0 illustrated here is a characteristic when not performing the middle injection P3, and, therefore, a value of an earlier-stage peak HAp of the earlier-stage combustion portion HA and a value of a later-stage peak HBp of the later-stage combustion portion HB become larger accordingly. In other words, a degree of fall of the heat release rate in the middle combustion portion HC increases.

An interval "In" (peak interval) between a timing when the earlier-stage peak HAp occurs and a time when the later-stage peak HBp occurs largely influences the reduction of combustion noise. If the interval is appropriately set so that an amplitude of a pressure wave (sound wave) resulting from the combustion of the earlier-stage combustion portion HA and an amplitude of a pressure wave resulting from the combustion of the later-stage combustion portion HB cancel each other out, the appearing pressure wave (combustion noise) can then be reduced by the frequency effect.

Figure 7B:
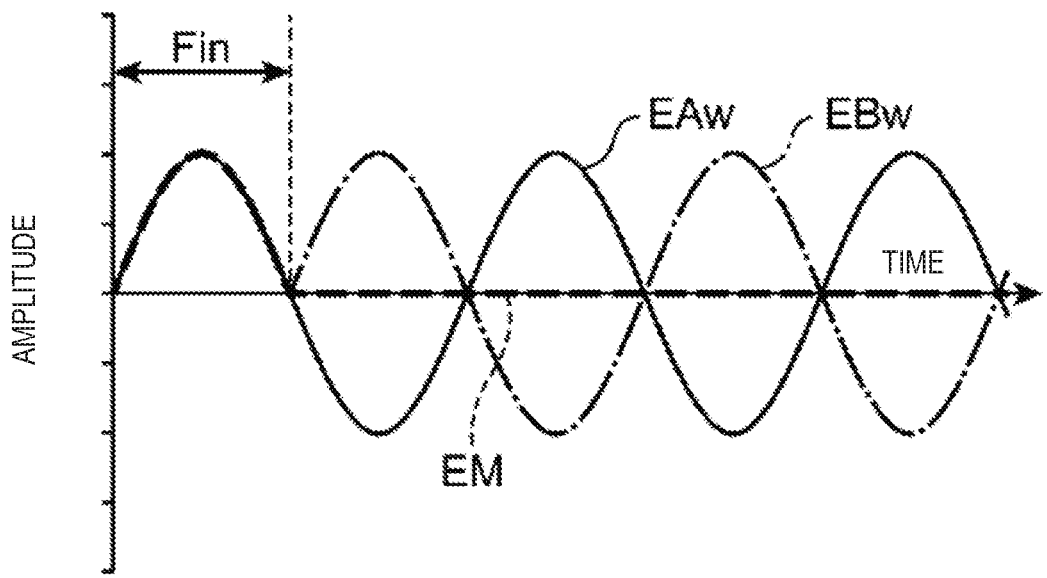
FIG. 7B is a schematic diagram illustrating a cancelation effect of pressure waves generated by these combustion.

FIG. 7B is a schematic diagram illustrating the cancelation effect of the pressure waves. In FIG. 7B, an earlier-stage pressure wave EAw resulting from the combustion of the earlier-stage combustion portion HA, and a later-stage pressure wave EBw resulting from the combustion of the later-stage combustion portion HB are illustrated. Here, in order to simplify the description, it is assumed that a peak height of the earlier-stage peak HAp and a peak height of the later-stage peak HBp are the same, and the amplitude of the earlier-stage pressure wave EAw and the amplitude of the later-stage pressure wave EBw are the same. Here, in order to cancel out both the pressure waves, the earlier-stage pressure wave EAw and the later-stage pressure wave EBw may appear with a ½ cycle offset. That is, a pressure-wave interval "Fin" until the occurrence of the later-stage pressure wave EBw following the earlier-stage pressure wave EAw may be set in a half (½) of the cycle of each of the pressure waves EAw and EBw. In this case, the earlier-stage pressure wave EAw and the later-stage pressure wave EBw may become opposite phases to each other and interfere with each other so that they cancel each other out, and, therefore, the amplitude of their synthetic wave EM becomes zero. That is, combustion noise is canceled out by the cancelation effect. Therefore, if the fuel injection controlling module 72 performs the pre-injection P1 and the main injection P2 so that the later-stage pressure wave EBw occurs ½ cycle behind of the earlier-stage pressure wave EAw, combustion noise can theoretically be reduced.

However, as described above, a combustion mode differs between the combustion by the pre-injection P1 (premix combustion) and the combustion by the main injection P2 (diffuse combustion). Therefore, the standup characteristics, etc. of the heat release rates by both the combustions become different from each other, and, as a result, a frequency component of the earlier-stage pressure wave EAw and a frequency component of the later-stage pressure wave EBw become naturally different. Even if the representative frequency components of both the pressure waves EAw and EBw are adjusted to be opposite phases, other frequency components do not become opposite phases, and therefore, both the pressure waves EAw and EBw cannot fully cancel each other out. Therefore, the present inventors recognized that, even if the pre-injection P1 and the main injection P2 which aim at the ½ cycle offset of both the pressure waves EAw and EBw were actually performed, combustion noise could not fully be reduced.

In this embodiment, the above problem is solved by directly reducing the earlier-stage and later-stage peaks HAp and HBp of the earlier-stage and later-stage combustion portions HA and HB in the heat release rate characteristic H, while aiming at the ½ cycle offset of both the pressure waves EAw and EBw. The middle injection P3 is performed in order to reduce the earlier-stage and later-stage peaks HAp and HBp. That is, the fuel injection amount required for one cycle is secured by the execution of the middle injection P3 in addition to the pre-injection P1 and the main injection P2. Therefore, the injection amounts of the pre-injection P1 and the main injection P2 can be reduced by the injection amount of the middle injection P3, and the peaks of the heat release rates by the respective combustions of the pre-injection P1 and the main injection P2 can be reduced accordingly.

Figure 8:
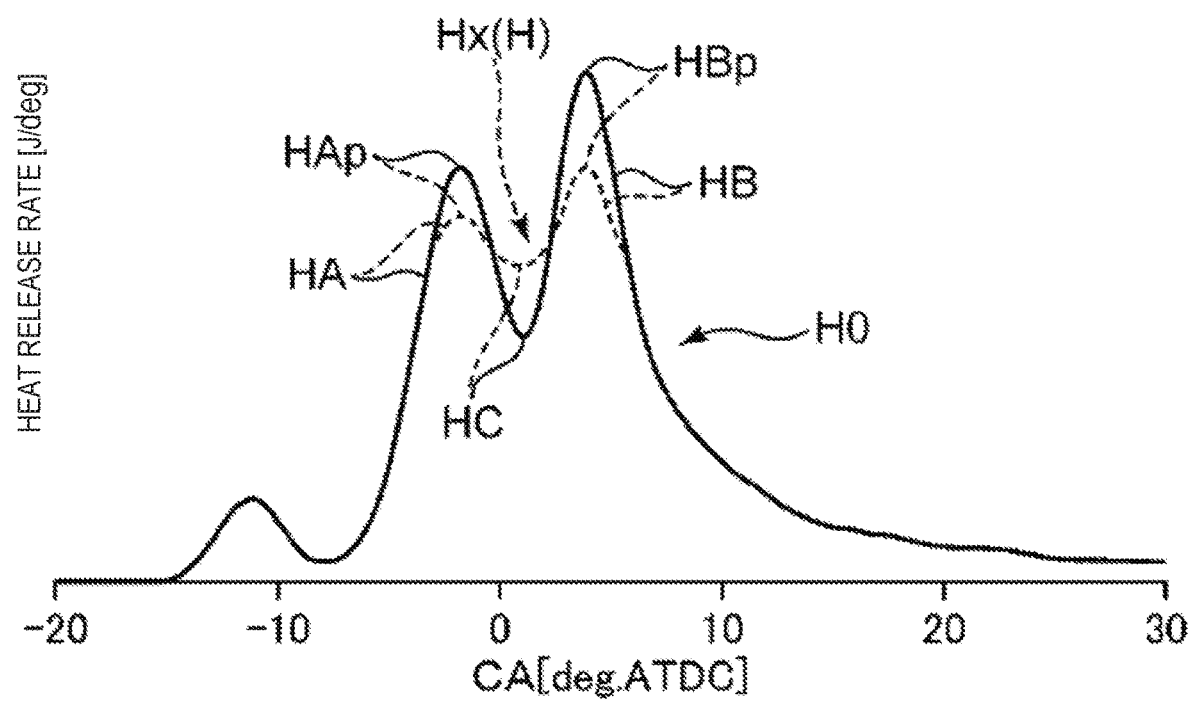
FIG. 8 is a graph illustrating a change in a heat release rate characteristic by a middle injection.

In FIG. 8, the heat release rate characteristic H0 (a solid line) when only the pre-injection P1 and the main injection P2 are performed, and a heat release rate characteristic Hx (a broken line; corresponding to the heat release rate characteristic H of FIG. 6) when the middle injection P3 is performed in addition to the pre-injection P1 and the main injection P2 are illustrated. The fuel injection controlling module 72 decreases a part of the injection amount assigned to the pre-injection P1 and the main injection P2, while maintaining the injection amount ratio of the pre-injection P1 and the main injection P2, and performs the middle injection P3 while assigning the reduced injection amount to the middle injection P3. Therefore, as illustrated in FIG. 8, the earlier-stage peak HAp of the earlier-stage combustion portion HA falls according to the reduced amount of the pre-injection P1, and the later-stage peak HBp of the later-stage combustion portion HB also falls according to the reduced amount of the main injection P2. Thus, since the peaks HAp and HBp of the heat release rate can be reduced, the magnitudes of the pressure waves EAw and EBw resulting from the respective combustions of the pre-injection P1 and the main injection P2 can be reduced. Combustion noise also decreases because the amplitudes of the pressure wave EAw and EBw become smaller. Therefore, combustion noise can effectively be reduced with the combination with the injection mode to cancel out the pressure waves EAw and EBw.

On the other hand, the heat release rate of the middle combustion portion HC is increased. Since the middle injection P3 is performed at the timing between the pre-injection P1 and the main injection P2, the combustion by the middle injection P3 serves to fill the valley between the earlier-stage peak HAp and the later-stage peak HBp. Therefore, the heat release rate of the middle combustion portion HC is raised. Thus, unlike the post injection performed at the retarding side of the main injection P2, the combustion by the middle injection P3 directly contributes to the engine torque, and will not reduce thermal efficiency. In addition, since the middle injection P3 is performed with the injection amount less than the pre-injection P1 and the main injection P2, it becomes possible to complete the combustion before the main injection P2, without affecting the combustion by the main injection P2. That is, since the combustion mode of the main injection P2 set so that the pressure waves EAw and EBw cancel each other out can be maintained, the cancelation effect of combustion noises will not be reduced.

[Desirable Fuel Injection Mode]

Figure 9:
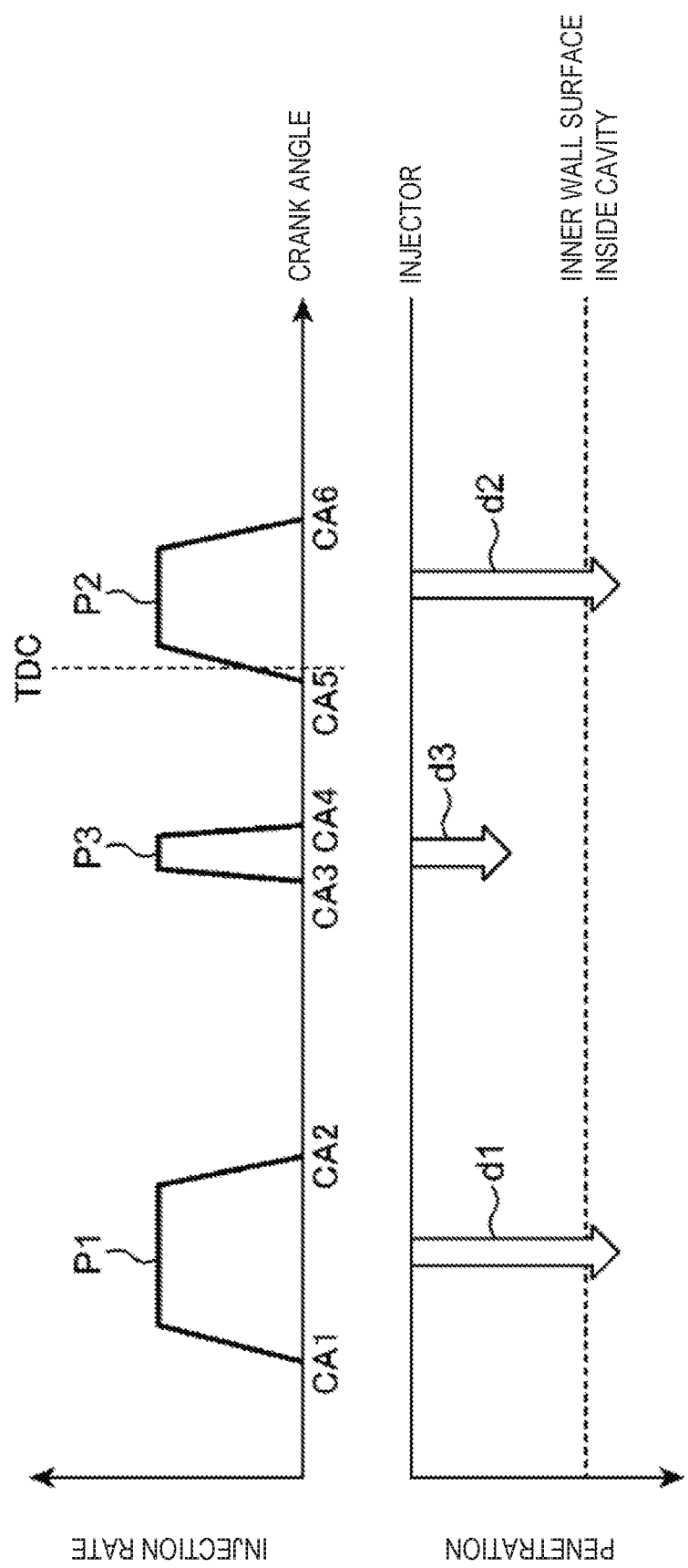
FIG. 9 is a schematic diagram illustrating start timings and end timings of the pre-injection, the main injection, and the middle injection, and penetrations of the injections.

FIG. 9 is a schematic diagram illustrating a relationship between start timings and end timings of the pre-injection P1, the main injection P2, and the middle injection P3, and penetrations d1, d2 and d3 of the injections P1, P2, and P3 (injection distance). Below, the desirable injection modes of the respective injections P1-P3 are described with reference to FIG. 9.

<Pre-Injection>

First, the fuel injection controlling module 72 is desirable to cause the injector 15 to perform the pre-injection P1 at the final stage of a compression stroke. In detail, when the compression stroke is equally divided into four by the crank angle, it is desirable to perform the pre-injection P1 in the final quarter period. The pre-injection P1 is an injection for the premix combustion performed at the advancing side of a TDC, as described above. In order to realize appropriate premix combustion, it is desirable to carry out the fuel injection at the final stage of the compression stroke.

That is, if the crank angle reaches the final quarter period of the compression stroke, although the in-cylinder temperature of the combustion chamber 6 does not reach the ignition temperature, the in-cylinder temperature is raised to some extent, and, therefore, a condition advantageous to the combustion of the mixture gas is established. When a part or all of the pre-injection P1 is performed at the first half of a compression stroke, or an intake stroke, there is concern that fuel spray injected from the injector 15 adheres to an inner wall surface of the cylinder 2 to induce soot and deposit. On the other hand, since premixed mixture gas is exposed to the environment where the fuel very easily combusts in the final quarter period of the compression stroke, the fuel can be combusted without reaching the inner wall surface of the cylinder 2. Of course, if the pre-injection P1 is performed at a too-late timing, the premix combustion cannot be realized, and the interval In during which the pressure-wave cancellation with the main injection P2 is performed cannot be secured. Therefore, it is desirable to perform the pre-injection P1 in the final quarter period of the compression stroke, while satisfying the condition which can achieve the premix combustion and the pressure-wave cancellation.

<Penetration of Each Injection>

Next, the desirable penetrations (injection distances) d1-d3 of the respective injections P1-P3 are described. When performing the pre-injection P1 and the main injection P2, the fuel injection controlling module 72 is desirable to set the injection period of the injector 15 so that the fuel spray injected from the injector 15 becomes a penetration which reaches the wall surface defining the combustion chamber 6 (the inner wall surface of the cavity 5C and the inner wall surface of the cylinder 2). On the other hand, when performing the middle injection P3, the fuel injection controlling module 72 is desirable to set the injection period of the injector 15 so that the fuel spray becomes a penetration which does not reach the wall surface of the combustion chamber 6.

In FIG. 9, the inner wall surface of the cavity 5C is assumed to be the wall surface. In the pre-injection P1, a start timing CA1 and an end timing CA2 of the pre-injection P1 (injection period) are set so that the penetration d1 which reaches the inner wall surface of the cavity 5C is obtained. In the pre-injection P1, the inner wall surface of the cavity 5C is a wall surface of the connecting part 53. Similarly, also in the main injection P2, a start timing CA5 and an end timing CA6 of the main injection P2 are set so that the penetration d2 which reaches the inner wall surface of the cavity 5C is obtained. In the main injection P2, the inner wall surface of the cavity 5C is a wall surface of the first cavity part 51.

On the other hand, in the middle injection P3, a start timing CA3 and an end timing CA4 of the middle injection P3 are set so that the penetration d3 which does not reach the inner wall surface of the cavity 5C is obtained. In detail, the penetration d3 that is shorter than a distance from the injection hole 152 of the injector 15 to the inner wall surface of the cavity 5C at the injection timing of the middle injection P3 is set. In other words, the fuel injection period of the middle injection P3 is set shorter than the pre-injection P1 and the main injection P2 so that such a penetration d3 can be obtained. As a result, since the fuel injection pressure when the injector 15 is opened is constant and the injection period is proportional to the injection amount, the fuel injection amount of the middle injection P3 is set to an amount smaller than the pre-injection P1 and the main injection P2.

By setting the penetrations d1-d3 as described above, the combustion which effectively uses the space (oxygen) inside the combustion chamber 6 can be realized. That is, since the fuel injected by the pre-injection P1 and the main injection P2 is sprayed with the comparatively large penetrations d1 and d2, the combustion can be carried out using oxygen existing in the area radially outward of the combustion chamber 6. On the other hand, since the fuel injected by the middle injection P3 is sprayed with the comparatively small penetration d3, the combustion can be carried out using the space in the radially center area of the combustion chamber 6. Therefore, the fuel injected by the middle injection P3 can certainly contribute to the engine torque. This issue will further be described later with reference to FIGS. 10 to 13.

<Start Timing and End Timing of Main Injection>

Desirable start and end timings of the main injection P2 are described. As described above, the main injection P2 is an injection which begins during the combustion period by the pre-injection P1 and causes the diffuse combustion utilizing the heat caused by the combustion of the pre-injection P1. In this nature, the main injection P2 is performed near a TDC. Here, the fuel injection controlling module 72 is desirable to set the injection period of the main injection P2 so that the start timing CA5 of the main injection P2 is closer to TDC compared to the end timing CA6 of the main injection P2.

When the start timing CA5 of the main injection P2 is set wastefully earlier, some or all of the fuel injected by the main injection P2 may not carry out the diffuse combustion. In order to certainly cause the diffuse combustion by the main injection P2, it is desirable to perform the main injection P2 after the peak of the combustion by the pre-injection P1 (the earlier-stage peak HAp illustrated in FIG. 8), i.e. after the in-cylinder temperature and pressure of the combustion chamber 6 become high enough. As described above, if the start timing CA5 is set closer to TDC compared to the end timing CA6, the main injection P2 will not be performed too early. Therefore, the explosive power by the diffuse combustion based on the main injection P2 can more efficiently be converted to engine torque.

<Start Timing of Middle Injection>

The middle injection P3 is an injection of the small penetration d3, performed at the timing between the pre-injection P1 and the main injection P2. As for such a middle injection P3, the fuel injection controlling module 72 is desirable to set the start timing CA3 of the middle injection P3 at a timing closer to the start timing CA5 of the main injection P2 compared to the end timing CA2 of the pre-injection P1.

The fuel injected by the middle injection P3 may be caught in the fuel injected by the main injection P2, if the combustion is not started by the start timing CA5 of the main injection P2. That is, before the fuel spray of the middle injection P3 combusts, the fuel spray of the middle injection P3 may be caught in the fuel spray of the main injection P2 and it may be carried to an area radially outward of the combustion chamber 6. In this case, it is assumed that the fuel of the middle injection P3 and the fuel of the main injection P2 are combusted in the same area of the combustion chamber 6, and oxygen inside the combustion chamber 6 is not effectively utilized. Moreover, the effects of directly lowering the later-stage peak HBp and reducing combustion noise is also diminished.

However, if the timing setup is performed as described above, the middle injection P3 can be started at the timing close to the start timing CA5 of the main injection P2. It may appear that the combustion of the middle injection P3 is delayed, but the start timing CA3 of the middle injection P3 is retarded more with respect to the end timing CA2 of the pre-injection P1. That is, the fuel of the middle injection P3 is supplied to the environment inside the combustion chamber 6 where the in-cylinder temperature is fully raised by the premix combustion by the pre-injection P1. Therefore, the fuel injected by the middle injection P3 can be combusted immediately, and being caught in the injected fuel of the main injection P2 can be prevented.

<Relationship of Injection Amount Between Three Injections>

As for a relationship between the injection amount of the pre-injection P1 and the main injection P2, the fuel injection controlling module 72 is desirable to set the fuel amount injected by the pre-injection P1 more than the fuel amount injected by the main injection P2. That is, it is desirable to set a period between the start timing CA1 to the end timing CA2 of the pre-injection P1 longer than a period between the start timing CA5 to the end timing CA6 of the main injection P2.

The pre-injection P1 is an injection directed to the connecting part 53 of the cavity 5C, and utilizes both the spaces of the first and second cavity parts 51 and 52. On the other hand, in the main injection P2, the space of the first cavity part 51 is exclusively utilized. That is, the pre-injection P1 becomes the injection for the larger space. According to such a use of the spaces, oxygen inside the combustion chamber 6 can efficiently be used in each injection by setting the fuel amount in the pre-injection P1 more than the main injection P2. This issue will be illustrated later.

The injection amount ratio of the pre-injection P1, the main injection P2, and the middle injection P3 is set suitably according to the operating condition, based on the condition where the middle injection P3 is performed with the less injection amount than the pre-injection P1 and the main injection P2. For example, if the injector 15 is 600 kPa in the injection pressure, and the engine speed is 2,000 rpm, each injection amount can be set as follows.

Pre-injection P1: 11.1 mm$^3$
Main injection P2: 7.8 mm$^3$
Middle injection P3: 3.6 mm$^3$ As being apparent from this example setting, the injection amount of the middle injection P3 is set less than about ⅓ of the pre-injection P1.

[Each Injection and Combustion Area]

The ideal mode of the combustion inside the combustion chamber 6 is to perform the combustion with oxygen existing inside the combustion chamber 6 being used up. As described in this embodiment, inside the combustion chamber 6 of which the bottom surface is defined by the crown surface 50 having the first and second cavity parts 51 and 52 lined up in the two steps in the vertical direction, the pre-injection P1, the main injection P2, and the middle injection P3 which were described above are performed in order to effectively utilize the oxygen existing inside the combustion chamber 6. For the effective use of the oxygen inside the combustion chamber 6, it is effective to separate the combustion areas for the injections P1-P3 spatially and in time. Below, the combustion areas for the injections P1-P3 are illustrated with reference to FIGS. 10 to 13.

<Pre-Injection>

FIG. 10 is a view illustrating a situation of the fuel injection of the pre-injection P1 into the cavity 5C by the injector 15, and a flow of the mixture gas after the injection. FIG. 10 is a cross-sectional view schematically illustrating the combustion chamber 6, and illustrates a relationship between the crown surface 50 (the cavity 5C) and the injection axis AX of an injected fuel 15P1 injected from the injector 15, and arrows F11, F12, F13, F21, F22, and F23 which schematically represent flows of the mixture gas after the injection.

The injector 15 is provided with the nozzle 151 disposed so as project downwardly toward the combustion chamber 6 from the combustion chamber ceiling surface 6U (the lower surface of the cylinder head 4). The nozzle 151 is provided with the injection hole 152 which injects fuel into the combustion chamber 6. Although in FIG. 10 one injection hole 152 is illustrated, a plurality of injection holes 152 are in fact disposed at equal pitch in the circumferential direction of the nozzle 151. The fuel injected from the injection hole 152 is injected along the injection axis AX in the figure. The injected fuel diffuses with a spray angle θ. In FIG. 10, an upper diffusion axis AX1 illustrating the diffusion upward of the injection axis AX, and a lower diffusion axis AX2 illustrating the diffusion downward of the injection axis AX are illustrated. The spray angle θ is an angle formed by the upper diffusion axis AX1 and the lower diffusion axis AX2.

In the pre-injection P1, the injector 15 injects fuel toward the connecting part 53 of the cavity 5C. That is, the injection axis AX is directed to the connecting part 53 by injecting fuel from the injection hole 152 to the piston 5 at a given crank angle. FIG. 10 illustrates a spatial relationship between the injection axis AX and the cavity 5C at the given crank angle. The fuel injected from the injection hole 152 is blown to collide the connecting part 53, while being mixed with air inside the combustion chamber 6 to form the mixture gas.

As illustrated in FIG. 10, the fuel 15P1 injected toward the connecting part 53 along the injection axis AX collides the connecting part 53, and is then spatially divided into two parts comprised of a fuel portion going toward (downward) the first cavity part 51 (the arrow F11) and a fuel portion going toward (upward) the second cavity part 52 (the arrow F21). That is, the fuel 15P1 injected while being directed to the center part 533 of the connecting part 53 is divided into the upper portion and the lower portion, and, after that, the upper and lower portions flow along the surface shapes of the first and second cavity parts 51 and 52, respectively, while being mixed with air existing in the cavity parts 51 and 52.

In detail, the mixture gas which goes toward (downward) the arrow F11 enters into the radially dented part 514 of the first cavity part 51 from the lower end part 531 of the connecting part 53, and flows downwardly. Then, the mixture gas changes its flow direction from downward to an inward direction in the radial direction B by the curved surface shape of the radially dented part 514, and as illustrated by the arrow F12, flows along the bottom surface shape of the first cavity part 51 having the first bottom part 512. At this time, the mixture gas is mixed with air inside the first cavity part 51 to be lower in the concentration. Since the mountain part 54 exists, the bottom surface of the first cavity part 51 has a shape which rises toward the center in the radial direction. Therefore, the mixture gas which flows in the arrow F12 direction is raised upwardly, and as illustrated by an arrow F13, it finally flows radially outwardly from the combustion chamber ceiling surface 6U. Also, in such a flow, the mixture gas is mixed with air which remains inside the combustion chamber 6 to become a homogeneous and leaner mixture gas.

On the other hand, the mixture gas which goes toward (upward) the arrow F21 enters into the taper area 524 of the second cavity part 52 from the third upper end part 532 of the connecting part 53, and goes obliquely downward along the inclination of the taper area 524. Then, as illustrated by the arrow F22, the mixture gas reaches the second bottom part 522. Here, the taper area 524 is a surface with an inclination along the injection axis AX (FIG. 3). Therefore, the mixture gas can flow smoothly in the radially outward direction. That is, the mixture gas can reach to a deeper position of the combustion chamber 6 in the radially outward direction due to the existence of the taper area 524 and the existence of the second bottom part 522 located below the third upper end part 532 of the connecting part 53.

Then, the mixture gas is raised upwardly by the standup curved surface of the standing wall area 525 from the second bottom part 522, and flows in the radially inward direction from the combustion chamber ceiling surface 6U. In such a flow illustrated by the arrow F22, the mixture gas is mixed with air inside the second cavity part 52, and becomes the homogeneous and leaner mixture gas. Here, since the standing wall area 525 extending upwardly substantially in the vertical direction exists radially outward of the second bottom part 522, the injected fuel (mixture gas) is prevented from reaching the inner circumference wall of the cylinder 2 (in general, a liner (not illustrated) exists). That is, although the mixture gas can flow to near a location radially outward of the combustion chamber 6 because of the formation of the second bottom part 522, the interference with the inner circumference wall of the cylinder 2 is prevented by the existence of the standing wall area 525. Therefore, the cooling loss due to the interference can be reduced.

Here, the standing wall area 525 is provided with a shape in which a lower part thereof is located inward of the upper end position thereof in the radial direction B. Therefore, the flow illustrated by the arrow F22 does not become excessively strong, and the mixture gas does not return overly inwardly in the radial direction B. If the flow of the arrow F22 is too strong, the mixture gas combusting in part F22 collides with newly injected fuel before the fuel is fully dispersed, and, therefore, the homogeneous combustion is impeded, which generates soot. However, the standing wall area 525 of this embodiment does not have the shape scooped out in the radially outward direction, and, therefore, the flow of the arrow F22 is restrained, and a flow which goes outward in the radial direction B illustrated by the arrow F23 is also generated. Since the flow is pulled by a reverse squish flow in the later stage of the combustion, the flow of the arrow F23 is especially easy to be generated. Therefore, the combustion in which a space radially outward of the standing wall area 525 (a squish space on the peripheral flat surface part 55) is also effectively utilized can be performed.

Figure 11:
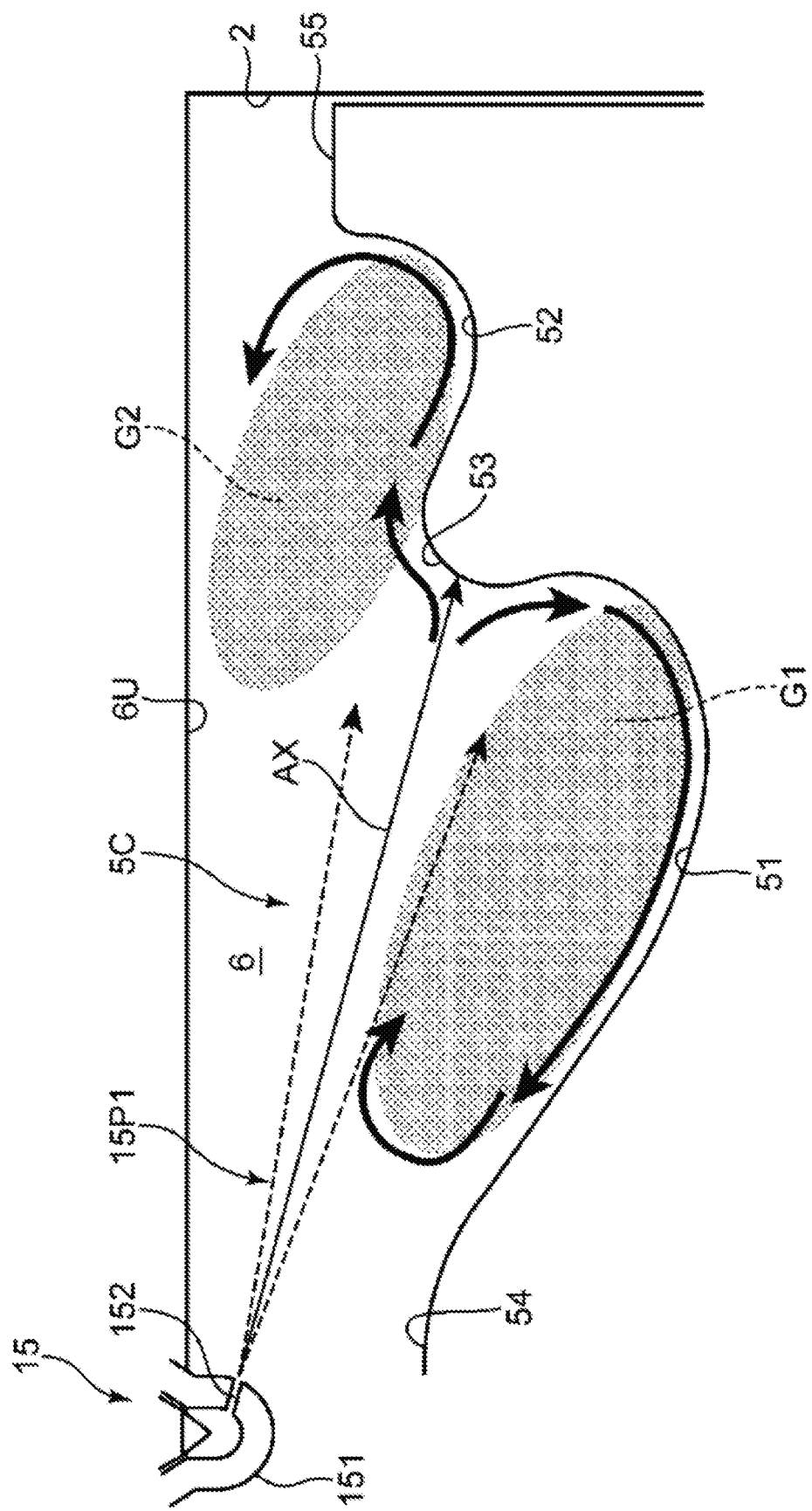
FIG. 11 is a cross-sectional view of the combustion chamber, illustrating generated areas of combustion in the pre-injection.

FIG. 11 is a cross-sectional view of the combustion chamber 6, illustrating primary areas where the premix combustion by the pre-injection P1 is generated. As described above, in the pre-injection P1, the fuel 15P1 injected toward the connecting part 53 along the injection axis AX collides with the connecting part 53 and is divided spatially, and forms the mixture gas by being mixed with air (oxygen) existing in the respective spaces of the first and second cavity parts 51 and 52, and then results in the combustion. Therefore, the combustion resulting from the pre-injection P1 is generated in a combustion area G1 which uses oxygen existing in the space of the first cavity part 51, and a combustion area G2 which uses oxygen existing in the space of the second cavity part 52. Thus, the premix combustion by the pre-injection P1 is performed after forming the homogeneous and leaner mixture gas by widely utilizing the spaces of the first and second cavity parts 51 and 52.

<Middle Injection>

Figure 12:
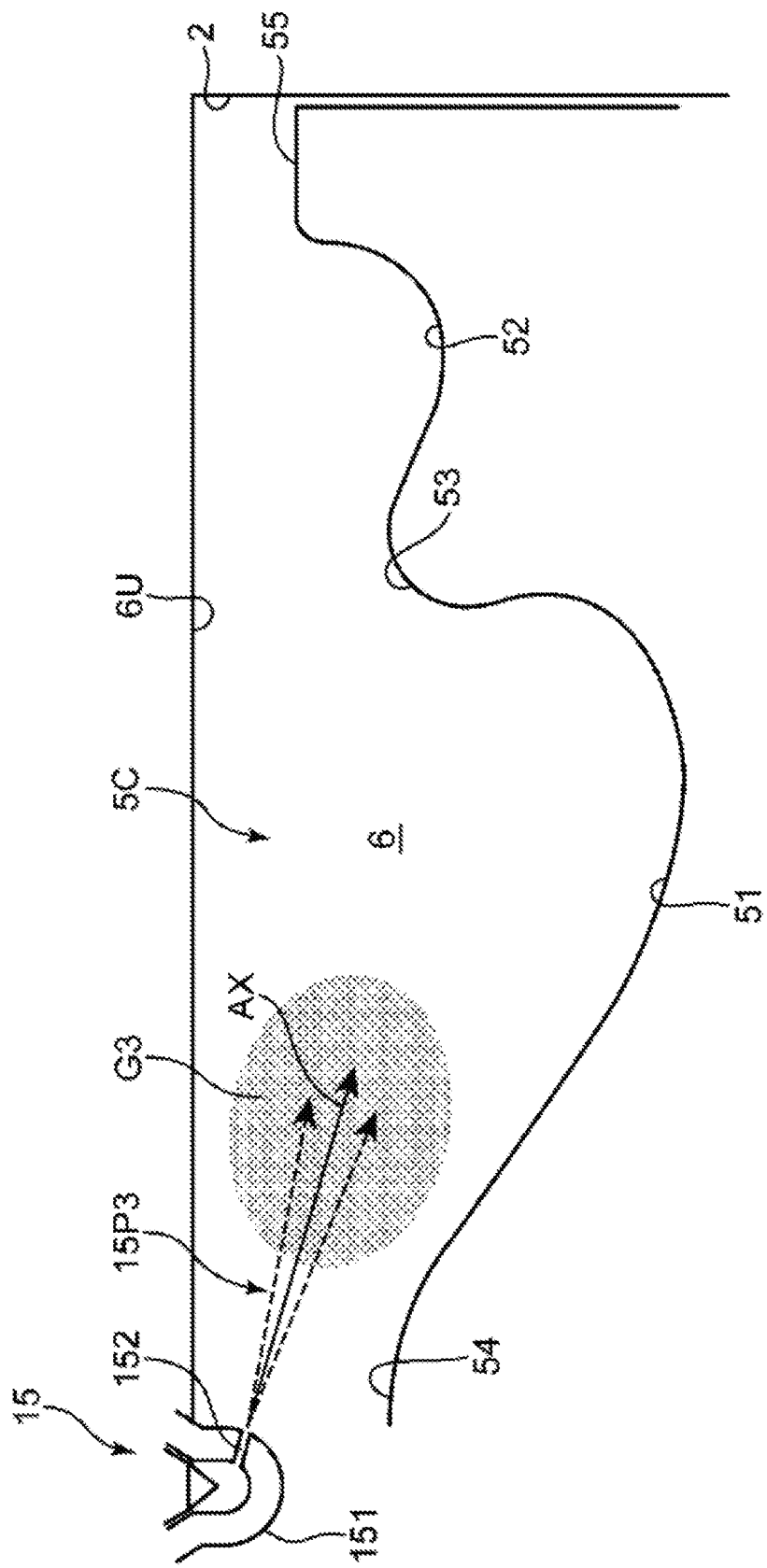
FIG. 12 is a cross-sectional view of the combustion chamber, illustrating a generated area of combustion in the middle injection.

FIG. 12 is a cross-sectional view of the combustion chamber 6, illustrating a primary area where the premix combustion by the middle injection P3 is generated. In the middle injection P3, an area near the radial center of the combustion chamber 6, which is not used for the premix combustion by the pre-injection P1 and the diffuse combustion by the main injection P2 as will be described next, is a combustion area G3. In the pre-injection P1, oxygen in the first and second cavity parts 51 and 52 is utilized. On the other hand, in the main injection P2, oxygen which remains in the first cavity part 51 is utilized. These combustions are both combustions which occur in an area other than near the radial center of the combustion chamber 6. On the other hand, in the middle injection P3, oxygen in the radially center area of the combustion chamber 6 which is not used for the pre-injection P1 and the main injection P2 is utilized positively to form and combust the mixture gas.

The middle injection P3 is an injection performed within a shorter injection period (injection amount) than the pre-injection P1 and the main injection P2, and its penetration is small. Therefore, fuel 15P3 injected along the injection axis AX by the middle injection P3 is difficult to reach the first and second cavity parts 51 and 52 and, thus, it is mixed exclusively with air near the radial center of the combustion chamber 6 to form the mixture gas, and creates the combustion area G3. By providing such a combustion area G3, oxygen existing inside the combustion chamber 6 can effectively be utilized, and a generation of soot, etc. can be reduced. Moreover, since the middle injection P3 is performed at the timing between the pre-injection P1 and the main injection P2 and creates the combustion area G3, the combustion by the middle injection P3 contributes to the engine torque.

<Main Injection>

Figure 13:
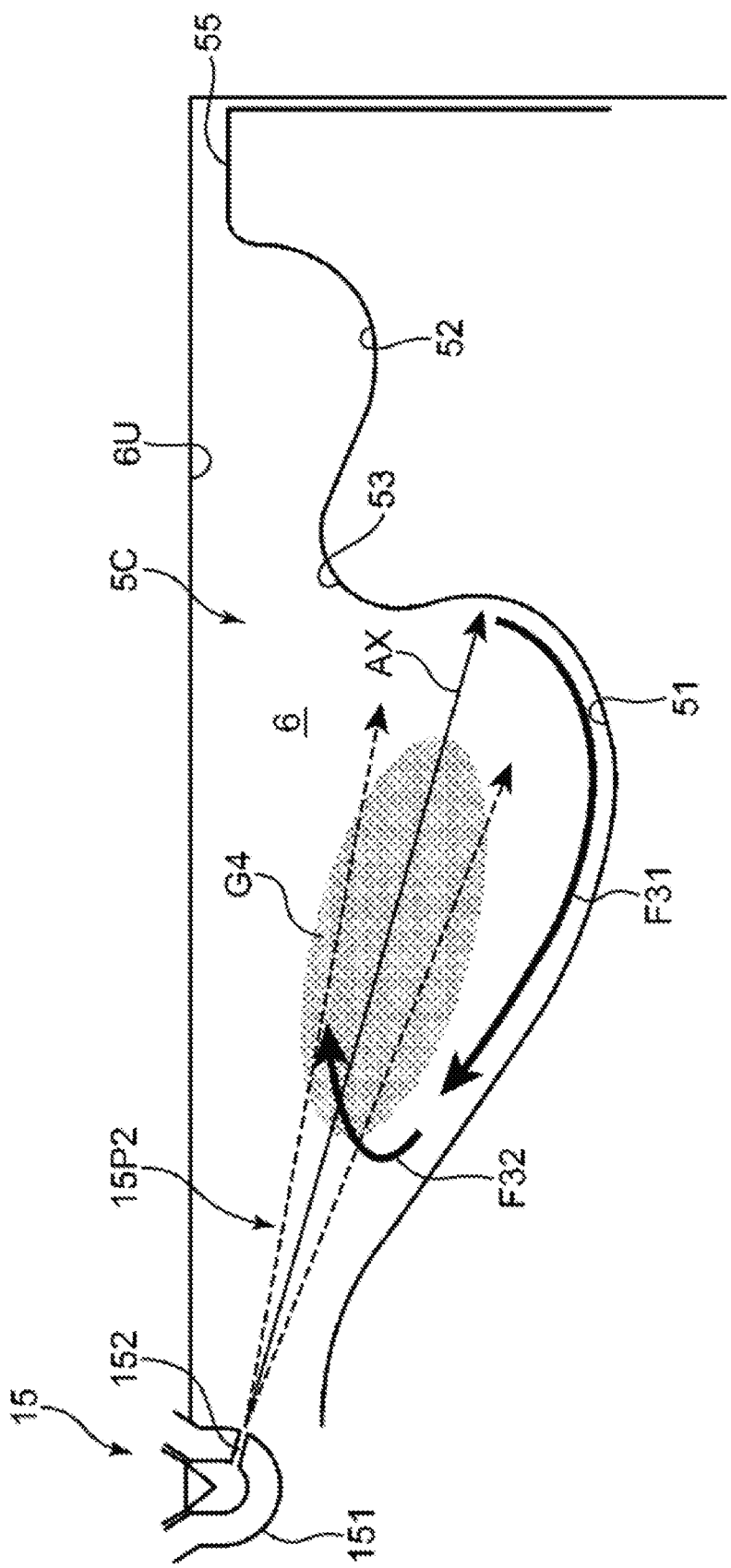
FIG. 13 is a cross-sectional view of the combustion chamber, illustrating a generated area of combustion in the main injection.

FIG. 13 is a cross-sectional view of the combustion chamber 6, illustrating a primary area where the diffuse combustion by the main injection P2 is generated. The main injection P2 is an injection performed at a timing retarded from the pre-injection P1 where fuel is injected toward the connecting part 53. In FIG. 6, one example where the main injection P2 is started near a TDC is illustrated. Moreover, the penetration of the main injection P2 is large enough to reach the cavity 5C. Therefore, fuel 15P2 injected along the injection axis AX by the main injection P2 is directed to a position slightly lower than the connecting part 53, i.e., to an upper area of the first cavity part 51. The fuel 15P2 collides with the upper area, and as illustrated by an arrow F31, it flows along the bottom surface shape of the first cavity part 51, and then, as illustrated by an arrow F32, it flows radially outward from the combustion chamber ceiling surface 6U.

The main injection P2 is an injection in which the fuel (mixture gas) injected by the pre-injection P1 enters into the spaces of the first and second cavity parts 51 and 52, and is divided spatially, and, after then, a new mixture gas is formed by utilizing air which remains in the space between the two portions of the divided mixture gas to create a combustion area G4. That is, the fuel of the pre-injection P1 first injected enters into the first and second cavity parts 51 and 52, and is mixed with air in the respective spaces to form the mixture gas, thereby generating the combustion areas G1 and G2 (spatial separation). Therefore, immediately before the main injection P2 is started, unused air (air which is not mixed with fuel) exists between the combustion areas G1 and G2. It can be said that the Egg Shape of the first cavity part 51 contributes to such a formation of the unused air layer. The injected fuel of the main injection P2 enters into the space between the combustion areas G1 and G2, and is mixed with unused air to form the mixture gas. Then, the combustion area G4 by the diffuse combustion is formed by the mixture gas being given heat from the combustion areas G1 and G2 by the previous pre-injection P1. This is the temporal separation of the fuel injection.

As described above, according to this embodiment, the injected fuel of the pre-injection P1 is divided spatially, and oxygen in the first and second cavity parts 51 and 52 is utilized. Moreover, the unused oxygen existing between the combustion areas G1 and G2 generated by the pre-injection P1 is utilized by the injection separated in time (the main injection P2) to form the combustion area G4. Then, oxygen near the radial center of the combustion chamber 6 which is not utilized for the pre-injection P1 and the main injection P2 is utilized for the middle injection P3 of which the penetration (injection period) is set in such an unused area to form the combustion area G3. Therefore, the combustion which effectively utilizes oxygen existing inside the combustion chamber 6 can be realized, thereby reducing the generation of soot, etc.

[Control Flow]

Figure 14:
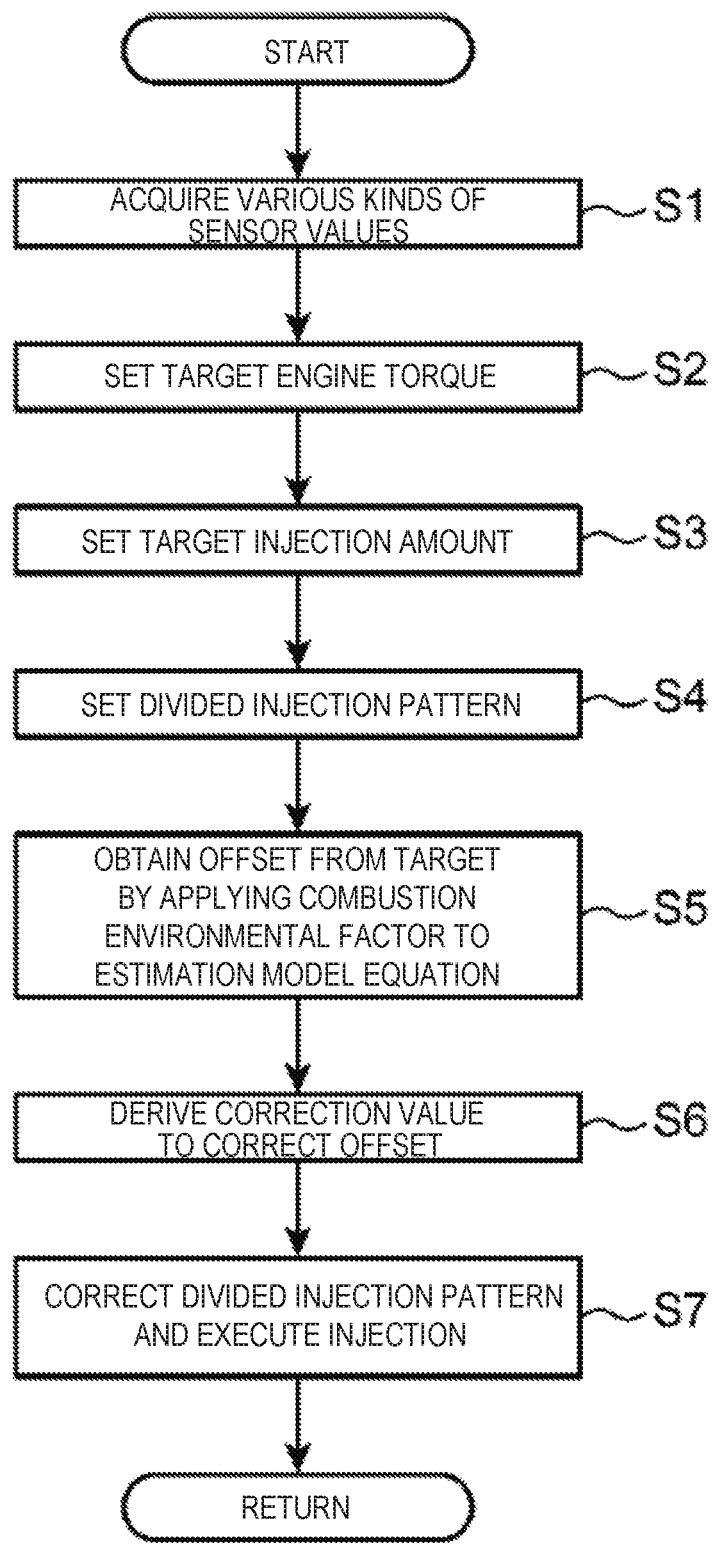
FIG. 14 is a flowchart illustrating one example of a fuel injection control.

FIG. 14 is a flowchart illustrating one example of a fuel injection control by the controller 70 (FIG. 5). The controller 70 acquires various kinds of sensor values from the sensors SN1-SN12 illustrated in FIG. 5 and other sensors (an in-cylinder-pressure sensor, etc.) at every given sampling cycle (Step S1). Therefore, information related to an operating range of the vehicle (the operating condition of the engine body 1) and environment information used as the combustion environmental factor (described below) are acquired. The operating condition determining module 73 determines, with reference to this information, whether the current operating range corresponds to the PCI range in which the premixed compression ignition combustion is to be performed. Here, a flowchart under a condition of being in the PCI range is illustrated.

Next, the target torque setting module 71 sets a target engine torque based on the accelerator opening detected by accelerator opening sensor SN10 (Step S2; target torque setting step). In response to this, the injection amount setting module 74 sets an injection amount of fuel to be supplied into the combustion chamber 6 from the injector 15 per one cycle (a cycle comprised of intake, compression, expansion, and exhaust stroke). The injection amount setting is a target injection amount to achieve the target torque (Step S3; fuel injection amount determining step).

Then, the injection pattern setting module 75 reads the setting map of the preset injection pattern for every target injection amount set at Step S3 (the combination of the engine speed and the engine load) from the memory 78, and sets the injection pattern according to the target injection amount (Step S4; injection pattern setting step). This injection pattern is a pattern including the pre-injection P1, the main injection P2, and the middle injection P3, where the pre-injection P1 and the main injection P2 are such that the pressure waves generated by the combustions caused by the injections cancel each other out. Moreover, a part of the injection amount originally to be assigned to the pre-injection P1 and the main injection P2 is reduced while maintaining the injection amount ratio of the injections P1 and P2, and the reduced amount is assigned to the middle injection P3.

Although various techniques are employable as this assignment, for example, injection parts on the end timing CA2 side and the end timing CA6 side (refer to FIG. 9) of the pre-injection P1 and the main injection P2 are reduced (shortening the tail end sides of the injection periods), and the reduced amounts are assigned to the middle injection P3. Moreover, the phrase "maintaining the injection amount ratio" as used herein refers to setting the following injection amount ratio. When the injection amount ratio of the injection amounts assigned to the pre-injection P1 and the main injection P2 is P1:P2=5:4, the injection amounts of both the injection P1 and P2 are reduced equally by 10%, for example (the relationship of P2=0.8×P1 is maintained), and these reduced parts are assigned to the middle injection P3 to set the injection amount ratio as

P1:P2:P3=4.5:3.6:0.9.

Note that at Step S4, the injection pattern setting module 75 may set the injection pattern by calculating it each time according to the target injection amount, without depending on the setting map.

Then, the estimating module 76 estimates an occurring timing of the peak of the heat release rate of the premix combustion based on the environment information (the combustion environmental factor) acquired at Step S1 by using the estimation model equation stored in the memory 78. Here, the occurring timing is evaluated based on a "peak delay" which means a delay time of the peak of the heat release rate of the premix combustion (the earlier-stage peak HAp) appears after starting the pre-injection P1 (the start timing CA1). Further, the estimating module 76 compares the estimated peak delay with a target peak delay when the combustion environmental factor is within a standard range to obtain an offset between the estimation and the target (Step S5).

Here, description is added for the combustion environmental factor. The primary combustion environmental factors which affect the controlling amounts inside the combustion chamber 6 include a wall surface temperature of the cylinder block 3, an in-cylinder pressure, an in-cylinder temperature, an in-cylinder oxygen concentration, an engine speed (load), a fuel injection amount, a fuel injection timing, and a fuel injection pressure. For example, the wall surface temperature, the in-cylinder pressure, and the in-cylinder temperature vary with an ambient temperature, an ambient pressure, and an engine cooling water temperature. Moreover, the in-cylinder oxygen concentration varies with an EGR gas amount taken into the combustion chamber 6. Moreover, the combustion environmental factors may also vary according to transitional factors when the operating condition changes largely (when the intake air temperature and the supercharging pressure are deviated transitionally).

FIGS. 15A to 15C are view illustrating a model equation to estimate the occurring timing of the earlier-stage peak HAp of the earlier-stage combustion portion HA in the heat release rate characteristic H. As illustrated in FIG. 15A, the occurring timing of the earlier-stage peak HAp is estimated by the "peak delay." Like this embodiment, when the fuel injection is divided into the pre-injection P1, the main injection P2, and the middle injection P3, the ignition timing is determined according to the executing situation of the pre-injection P1 which injects a comparatively larger amount of fuel at the earliest timing. When the mode of the pre-injection P1 is determined, the combustion accompanying the main injection P2 becomes combustion which is comparatively high in robustness. Therefore, the earlier-stage peak HAp (ignition timing) is used as the target for the adjustment.

FIG. 15B illustrates the estimation model equation of the peak delay used by the estimating module 76. Here, the characteristic of each factor is expressed by the Arrhenius type estimation equation. The right-hand side of the equation includes items, such as a coefficient A, the fuel injection amount, the fuel injection timing, the fuel injection pressure, the in-cylinder pressure, the in-cylinder temperature, the wall surface temperature, the in-cylinder oxygen concentration, and the engine speed. The coefficient A is an intercept which entirely varies the value of the right-hand side. Indexes B to I given to the items of the right-hand side illustrate the sensitivities of the items, where the positive sign indicates proportionality and the negative sign indicates an inverse proportion. Note that an engine oil temperature may also be added as the item.

FIG. 15C is a table illustrating a calibration result of the estimation model equation, where the value of the coefficient A, and the values of the indexes B to I are illustrated. This result is such that the parameters related to the injection, such as the fuel injection amount, the fuel injection timing, and the fuel injection pressure, are fixed to reference values corresponding to the target heat release rate characteristic, and many data is acquired by changing the controlling amounts, such as the ambient temperature, the ambient pressure, then engine cooling water temperature, and the EGR gas amount and a variation in the combustion state (the rate of heat release) and the in-cylinder state variation are associated with each other by a multiple linear regression analysis. It is confirmed that a difference between the estimation result of the "peak delay" by the estimation model equation (the crank angle at which the earlier-stage peak HAp occurs) and the "peak delay" by the actual measurement is ±2 deg. or less.

Next, the correcting module 77 derives a correction value to correct the fuel injection timing of the pre-injection P1 set at Step S4 so that the offset obtained at Step S5 is corrected (Step S6). That is, a fuel injection timing of the pre-injection P1 to be able to cause the earlier-stage peak HAp to appear at a target timing is derived. When the occurring timing of the peak of the earlier-stage peak HAp is estimated to be late with respect to the target occurring timing, the start timing CA1 of the pre-injection is corrected to be advanced, and, on the other hand, when it is estimated to be early, the start timing CA1 is corrected to be retarded. Of course, if the combustion environmental factor is within a preset center range where the correction is not necessary, the correction by the correcting module 77 will not be performed. Note that as for the main injection P2 and the middle injection P3, both are the diffuse combustions, and, therefore, since the peak delays hardly occur, the changes in the fuel injection timings are not necessary.

Then, the injection pattern setting module 75 corrects the execution timing of the pre-injection P1 with reference to the correction value acquired at Step S6, and then sets the final values of the fuel injection amounts and the fuel injection timings for the pre-injection P1, the main injection P2, and the middle injection P3. Then, the fuel injection controlling module 72 controls the injector 15 as the setting to perform the fuel injection (Step S7).

[Operation & Effects]

According to the engine control device and the engine control method according to this embodiment described above, the fuel injection amount required for one cycle can be secured by performing the middle injection P3, in addition to the pre-injection P1 and the main injection P2 which are performed so that the pressure waves resulting from both the combustions cancel each other out. Therefore, the injection amounts of the pre-injection P1 and the main injection P2 can be reduced by the injection amount taken by the middle injection P3, and the peak values of the earlier-stage peak HAp and the later-stage peak HBp of the heat release rate caused by the combustions of the pre-injection P1 and the main injection P2 can be reduced by the reduced amounts. That is, the magnitudes of the earlier-stage pressure wave EAw and the later-stage pressure wave EBw resulting from the combustions of the pre-injection P1 and the main injection P2 can be directly reduced. Therefore, combustion noise can be reduced effectively with the help of such injections that the pressure waves EAw and EBw cancel each other out.

Moreover, the middle injection P3 is performed at the timing between the pre-injection P1 and the main injection P2. Therefore, since the combustion by the middle injection P3 serves as filling of the valley of the peaks of the heat release rates by the combustions of the pre-injection P1 and the main injection P2 and contributes to the engine torque, it does not reduce the thermal efficiency. In addition, since the middle injection P3 is performed with a small injection amount, it becomes possible to complete the combustion before the main injection P2, and it does not affect the combustion by the main injection P2. That is, since the combustion mode of the main injection P2 which is set so that the pressure waves EAw and EBw cancel each other out can be maintained, the cancelation effect of combustion noise will not be reduced.

[Modifications]

As described above, although the embodiment of the present disclosure is described, the present disclosure is not limited to this configuration and, for example, the following modifications can be adopted.

(1) In the above embodiment the example in which the pre-injection P1, the main injection P2, and the middle injection P3 are performed as the fuel injection pattern is illustrated. This is merely an example and may additionally be provided with another injection. For example, after the main injection P2, a post injection may be performed aiming at a further reduction of soot. Moreover, although in the above embodiment the example in which the pre-injection P1 and the middle injection P3 are each performed by one injection is described, each injection may be performed by 2 times or more injections which divide the assigned injection amount.

(2) In the above embodiment, the example in which the cavity 5C of the piston 5 which defines the bottom surface of the combustion chamber 6 has the two-step Egg Shape provided with the first cavity part 51 and the second cavity part 52. The injection control according to the present disclosure is applicable to other dented cavities, such as a cavity provided with one-step dent.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
2 Cylinder
5 Piston
5C Cavity (Wall Surface Defining Combustion Chamber)
6 Combustion Chamber
15 Injector (Fuel Injection Valve)
70 Controller (Control Device For Engine)
71 Target Torque Setting Module (for Target Torque Setting Step)
72 Fuel Injection Controlling Module
74 Injection Amount Setting Module (for Injection Amount Setting Step)
75 Injection Pattern Setting Module (for Injection Pattern Setting Step)
76 Estimating Module
77 Correcting Module
P1 Pre-Injection
P2 Main Injection
P3 Middle Injection
EAw Earlier-Stage Pressure Wave (Pressure Wave Caused by Pre-Injection)
EBw Later-Stage Pressure Wave (Pressure Wave Caused by Main-Injection)

What is claimed is:

1. A method of controlling an engine including a combustion chamber and a fuel injection valve configured to directly inject fuel into the combustion chamber, comprising the steps of:
    setting a target torque of the engine according to an operating condition;
    determining a fuel injection amount to be supplied to the combustion chamber in one cycle based on the set target torque; and
    setting an injection pattern for causing the fuel injection valve to perform an injection operation with the determined fuel injection amount, wherein setting the injection pattern includes:
        setting an injection pattern including a pre-injection performed at a timing when a piston is located at an advancing side of a compression top dead center for premix combustion, a main injection started at a retarding side of the pre-injection and during a combustion period of the pre-injection for diffuse combustion, and a middle injection performed at a timing between the pre-injection and the main injection;
        setting fuel injection timings and an injection amount ratio of the pre-injection and the main injection so that pressure waves resulting from combustions by the pre-injection and the main injection cancel each other out; and
        decreasing a part of the injection amounts assigned to the pre-injection and the main injection, while maintaining the injection amount ratio, and assigning the reduced injection amount to the middle injection.

2. The method of claim 1, wherein when a compression stroke is equally divided into four quarter periods by a crank angle, the injection pattern is set so that the pre-injection is performed in a final quarter period.

3. The method of claim 1, wherein the injection pattern is set so that, when performing each of the pre-injection and the main injection, a fuel spray injected from the fuel injection valve has an injection distance that reaches a wall surface defining the combustion chamber, and when performing the middle injection, the fuel spray has an injection distance that does not reach the wall surface.

4. The method of claim 1, wherein an injection period of the main injection is set so that a start timing of the main injection is closer to a compression top dead center compared to an end timing of the main injection.

5. The method of claim 1, wherein a start timing of the middle injection is set at a timing closer to a start timing of the main injection compared to an end timing of the pre-injection.

* * * * *